(12) United States Patent
Azidehak et al.

(10) Patent No.: US 10,734,914 B2
(45) Date of Patent: Aug. 4, 2020

(54) FAULT-TOLERANT CONTROLLER FOR MODULAR MULTI-LEVEL CONVERTERS

(71) Applicant: North Carolina State University, Raleigh, NC (US)

(72) Inventors: Ali Azidehak, Raleigh, NC (US); Subhashish Bhattacharya, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/363,485

(22) Filed: Mar. 25, 2019

(65) Prior Publication Data

US 2019/0296654 A1 Sep. 26, 2019

Related U.S. Application Data

(60) Provisional application No. 62/647,284, filed on Mar. 23, 2018.

(51) Int. Cl.
*H02M 7/483* (2007.01)
*H02M 1/32* (2007.01)
*H02M 1/00* (2006.01)

(52) U.S. Cl.
CPC ............ *H02M 7/483* (2013.01); *H02M 1/32* (2013.01); *H02M 2001/007* (2013.01); *H02M 2001/0012* (2013.01); *H02M 2001/325* (2013.01); *H02M 2007/4835* (2013.01)

(58) Field of Classification Search
CPC ... H02M 2007/4835; H02M 2001/007; H02M 2001/325

USPC ..... 323/270, 272, 276; 361/67, 88, 90, 93.1; 363/65, 67, 68, 71, 78, 79
See application file for complete search history.

(56) References Cited

U.S. PATENT DOCUMENTS

| | | | | |
|---|---|---|---|---|
| 8,274,265 | B1* | 9/2012 | Khanna ............... | H02M 3/1584 323/225 |
| 8,710,810 | B1* | 4/2014 | McJimsey ........... | H02M 3/1584 323/272 |
| 9,425,705 | B2* | 8/2016 | Zargari ................ | H02M 1/32 |
| 2014/0192570 | A1* | 7/2014 | Nielsen ................ | H02J 1/102 363/50 |
| 2016/0261180 | A1* | 9/2016 | Brueckner ........... | H02M 1/32 |

\* cited by examiner

*Primary Examiner* — Gary A Nash
(74) *Attorney, Agent, or Firm* — Thomas Horstemeyer, LLP

(57) ABSTRACT

Various examples are provided related to fault-tolerant controller architectures for multi-level converters. In one example, a multi-level converter includes an array of power modules. The power modules can include a controller communicatively coupled to controllers of adjacent power modules in the array of power modules. Circuitry of the controllers can receive operational data from the adjacent power modules; identify a fault condition in an adjacent power module using the operational data; and initiate reconfiguration of the array of power modules in response to an indication of the fault condition, where the reconfiguration bypasses the adjacent power module. In another example, a method includes identifying a fault condition in an adjacent power module in an array of power modules based upon operational data from one or more adjacent power modules of the array; and initiating reconfiguration of the array of power modules in response to an indication of the fault condition.

20 Claims, 31 Drawing Sheets

Table 1 (top-left):

|   | 0 | 1 | 2 |
|---|---|---|---|
| 0 | 0 | 7 | 14 |
| 1 | 5 | 12 | 19 |
| 2 | 10 | 17 | 24 |
| 3 | 15 | 22 | 29 |
| 4 | 20 | 27 | 34 |
| 5 | 25 | 32 | 39 |
| 6 | 30 | 37 | 44 |
| 7 | 35 | 42 | 49 |
| 8 | 40 | 47 | 54 |
| 9 | 45 | 52 | 59 |

Table 2 (top-right):

|   | 0 | 1 | 2 |
|---|---|---|---|
| 0 | 0 | OFF | 24 |
| 1 | 5 | 12 | 19 |
| 2 | 10 | 17 | 24 |
| 3 | 15 | 22 | 29 |
| 4 | 20 | 27 | 34 |
| 5 | 25 | 32 | 39 |
| 6 | 30 | 37 | 44 |
| 7 | 35 | 42 | 49 |
| 8 | 40 | 47 | 54 |
| 9 | 45 | 52 | 59 |

Table 3 (middle-left):

|   | 0 | 1 | 2 |
|---|---|---|---|
| 0 | 0 | 7 | 14 |
| 1 | OFF | OFF | 19 |
| 2 | 38 | 31 | 24 |
| 3 | 43 | 36 | 29 |
| 4 | 48 | 41 | 34 |
| 5 | 53 | 46 | 39 |
| 6 | 58 | 51 | 44 |
| 7 | 63 | 56 | 49 |
| 8 | 68 | 61 | 54 |
| 9 | 73 | 66 | 59 |

Table 4 (middle-right):

|   | 0 | 1 | 2 |
|---|---|---|---|
| 0 | 0 | 7 | 14 |
| 1 | OFF | OFF | 19 |
| 2 | 38 | 31 | 24 |
| 3 | 43 | OFF | OFF |
| 4 | 48 | 55 | 62 |
| 5 | 53 | 60 | 67 |
| 6 | 58 | 65 | 72 |
| 7 | 63 | 70 | 77 |
| 8 | 68 | 75 | 82 |
| 9 | 73 | 80 | 87 |

Table 5 (bottom-left):

|   | 0 | 1 | 2 |
|---|---|---|---|
| 0 | 0 | 7 | 14 |
| 1 | OFF | 12 | 19 |
| 2 | OFF | 17 | 24 |
| 3 | OFF | 22 | 29 |
| 4 | OFF | 27 | 34 |
| 5 | 39 | 32 | 39 |
| 6 | 44 | 37 | 44 |
| 7 | 49 | 42 | 49 |
| 8 | 54 | 47 | 54 |
| 9 | 59 | 52 | 59 |

Table 6 (bottom-right):

|   | 0 | 1 | 2 |
|---|---|---|---|
| 0 | 0 | 7 | 14 |
| 1 | 5 | 12 | 19 |
| 2 | OFF | OFF | OFF |
| 3 | OFF | OFF | OFF |
| 4 | OFF | OFF | OFF |
| 5 | OFF | OFF | OFF |
| 6 | OFF | OFF | OFF |
| 7 | OFF | OFF | OFF |
| 8 | OFF | OFF | OFF |
| 9 | OFF | OFF | OFF |

FIG. 27

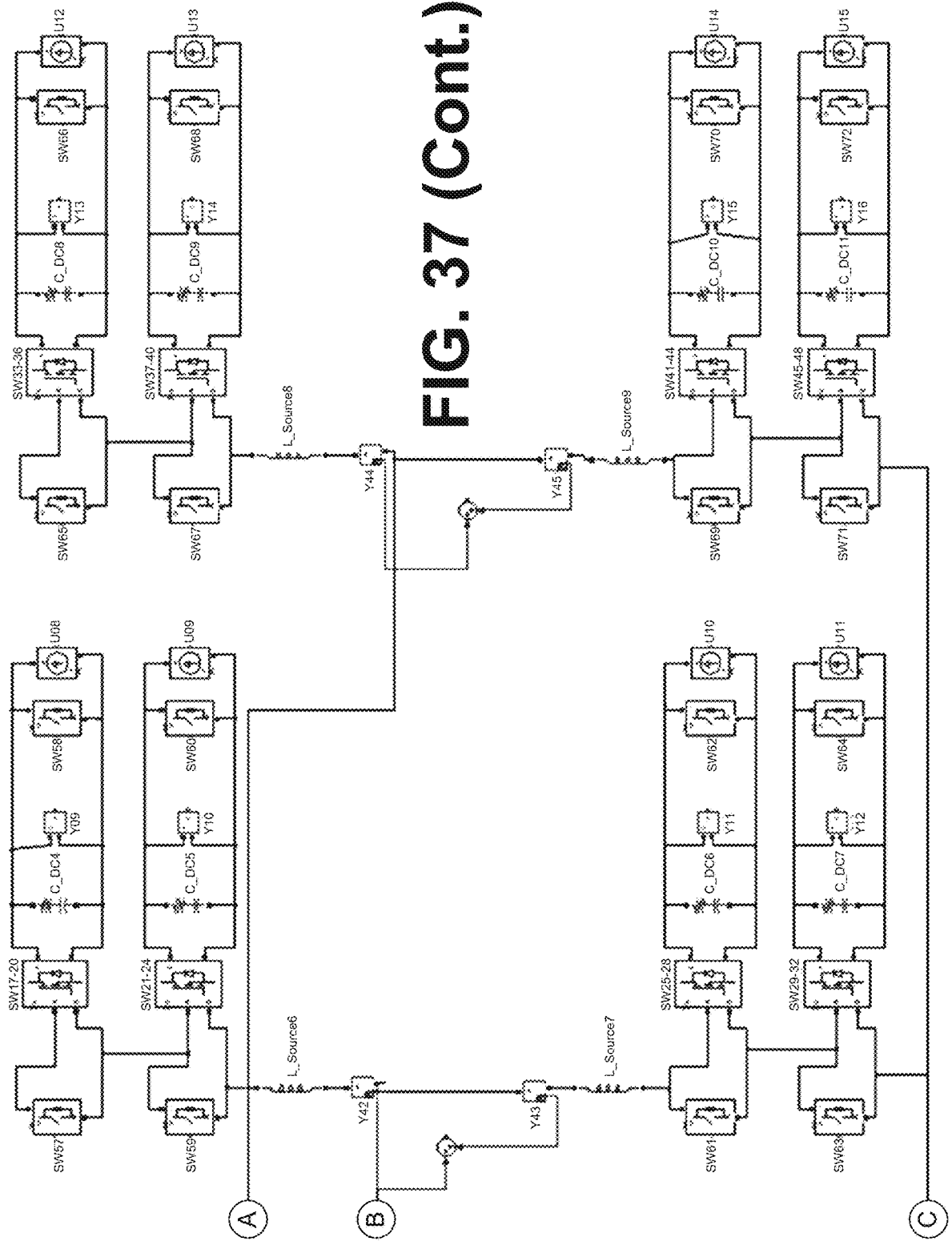

| ▽ ⚙ Conv1.CapacitorVoltages | float[12] | {16.6300373,15.0671549,14.5299149,15.45... |
|---|---|---|
| ◆▶ [0] | float | 15.6532364 |
| ◆▶ [1] | float | 16.2393169 |
| ◆▶ [2] | float | 16.1904774 |
| ◆▶ [3] | float | 15.2136755 |
| ◆▶ [4] | float | 43.5854649 |
| ◆▶ [5] | float | 38.6566585 |
| ◆▶ [6] | float | 43.5351028 |
| ◆▶ [7] | float | 44.1269836 |
| ◆▶ [8] | float | 43.4432259 |
| ◆▶ [9] | float | 42.0268631 |
| ◆▶ [10] | float | 42.0268631 |
| ◆▶ [11] | float | 42.5641022 |

FIG. 38

| ▽ ⚙ Conv1.CapacitorVoltages | float[12] | {15.6943959,16.2393169,15.2094784,15.79... |
|---|---|---|
| ◆▶ [0] | float | 17.411473 |
| ◆▶ [1] | float | 12.9181929 |
| ◆▶ [2] | float | 16.3369961 |
| ◆▶ [3] | float | 16.2393169 |
| ◆▶ [4] | float | 43.1990342 |
| ◆▶ [5] | float | 39.4671728 |
| ◆▶ [6] | float | 45.0061073 |
| ◆▶ [7] | float | 44.8595848 |
| ◆▶ [8] | float | 43.4432259 |
| ◆▶ [9] | float | 42.2222314 |
| ◆▶ [10] | float | 42.6129417 |
| ◆▶ [11] | float | 42.0268631 |

FIG. 39

| ▽ ⚙ Conv1.CapacitorVoltages | float[12] | {16.9719181,15.6532364,15.6532364,15.16... |
|---|---|---|
| ◆▶ [0] | float | 16.092963 |
| ◆▶ [1] | float | 14.2368746 |
| ◆▶ [2] | float | 15.8485966 |
| ◆▶ [3] | float | 15.3601952 |
| ◆▶ [4] | float | 42.6129417 |
| ◆▶ [5] | float | 37.6312599 |
| ◆▶ [6] | float | 44.1269836 |
| ◆▶ [7] | float | 44.7619057 |
| ◆▶ [8] | float | 43.7851028 |
| ◆▶ [9] | float | 41.6361427 |
| ◆▶ [10] | float | 43.6990342 |
| ◆▶ [11] | float | 42.3083038 |

FIG. 40

FAULT-TOLERANT CONTROLLER FOR MODULAR MULTI-LEVEL CONVERTERS

CROSS REFERENCE TO RELATED APPLICATIONS

This application claims priority to, and the benefit of, U.S. provisional application entitled "Fault-Tolerant Controller for Modular Multi-Level Converters" having Ser. No. 62/647,284, filed Mar. 23, 2018, which is hereby incorporated by reference in its entirety.

STATEMENT REGARDING FEDERALLY SPONSORED RESEARCH OR DEVELOPMENT

This invention was made with government support under grant number DE-EE0007508 awarded by the Department of Energy. The government has certain rights in the invention.

BACKGROUND

Voltage source multi-level converters (MC) are one of the options for rectifying and inverting in high power applications. Each converter can comprise several modules connected together to form a single converter. Power rating of the converter is usually more than the desired rating and it is possible to continue operation by bypassing the failed modules. This capability increases the reliability of this category of converters compared to other type of converters.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 27 illustrates examples of synchronization delay of the DOMINO synchronization mechanism in different failure cases, in accordance with various embodiments of the present disclosure.

FIGS. 38-40 illustrate examples of capacitor voltage readings across switches in the H-bridge, in accordance with various embodiments of the present disclosure.

DETAILED DESCRIPTION

Figure 1:
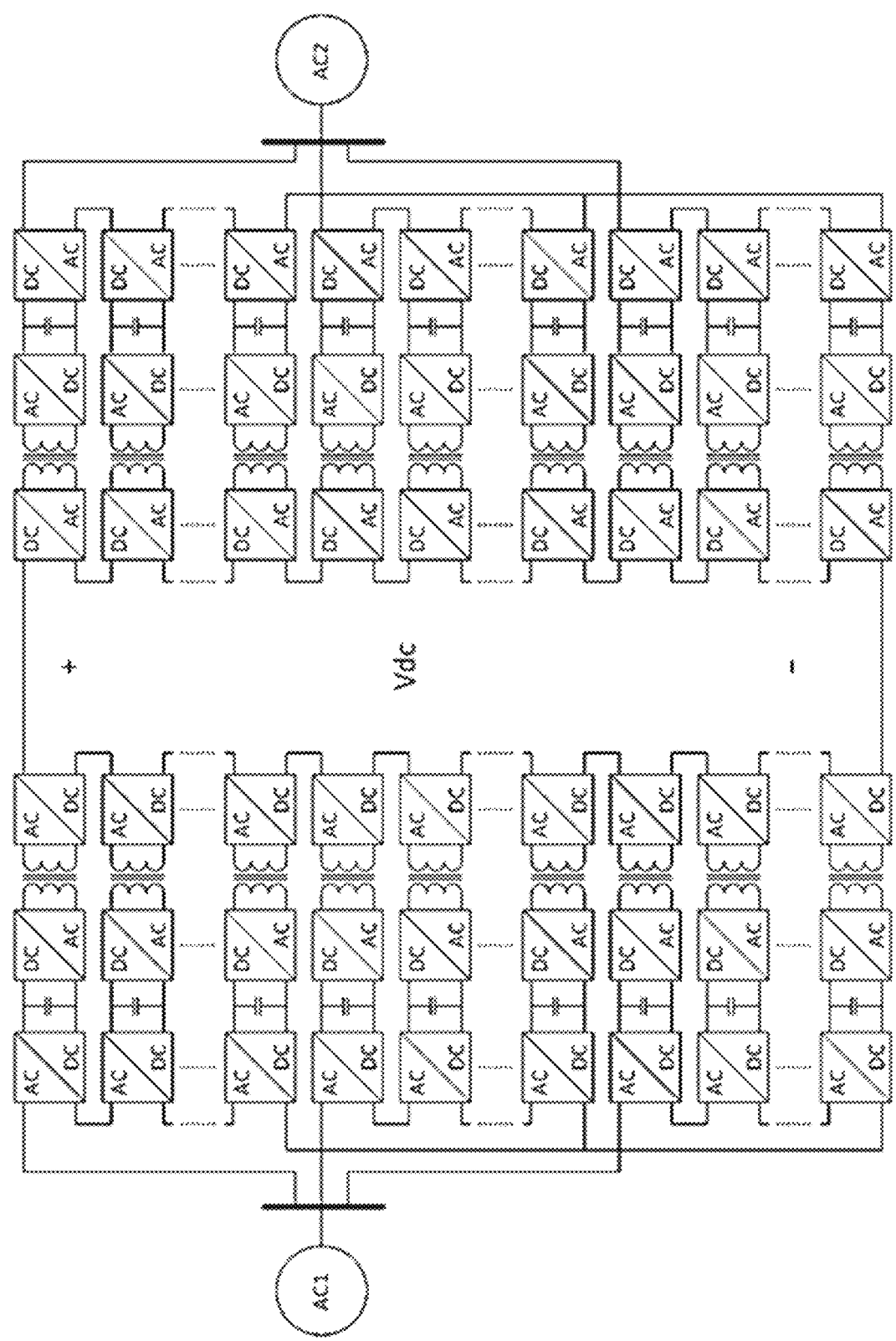
FIG. 1 is a schematic diagram illustrating an example of a cascaded H-bridge converter (CHB) with an isolated output, in accordance with various embodiments of the present disclosure.

Disclosed herein are various embodiments of methods related to fault-tolerant controller architectures for multi-level converters. In this disclosure, a distributed controller is presented that implements hot standby techniques to increase reliability and availability of the converter. Each slave controller can be directly connected to a power electronic module with data links to neighbor controllers and all of the controllers can be synchronized through a master controller. A reliability assessment of the disclosed controller based on Markov modeling is represented and experimental results affirm the feasibility of the control method. Reference will now be made in detail to the description of the embodiments as illustrated in the drawings, wherein like reference numbers indicate like parts throughout the several views.

There are several proposed architectures for multi-level converters. Some types of multi-level converters like cascaded H-bridge converter (CHB) and modular multi-level converter (MMC) architectures comprise cascaded power modules in each of the converter leg. FIG. 1 is a schematic diagram illustrating an example of a CHB with an isolated output. The main benefits that are associated with such multi-level converters are higher voltage (power) rating and modularity due to the usage of multiple series blocks. These benefits are not readily available and axillary circuits can be used to drive and control the converter modules. From a reliability point of view, whenever blocks are in series, any fault in one of the modules can interrupt the functionality of the system. In practice, faulty modules can be bypassed to continue operation at the cost of decreasing the maximum operational voltage. The reconfigured blocks would have lower voltage ratings but would still be operable in certain conditions.

Reconfiguration of the faulty module is not limited to the power electronic stages but can also be applied to the controllers of the converter. In previous work, design of fault-tolerant controllers for simple converters with a centralized controller has been addressed. Multi-level converters have a higher number of power modules and it is not possible to control all the power modules using a centralized controller. In order to achieve that, distributed controllers can be used for each of the modules and, in case of failure, a neighbor controller can take the control of the faulty module. Such distributed control methods can handle the failure of the power modules in a better manner than using a centralized controller. In this disclosure, the design of a fault-tolerant distributed controller for cascaded multi-level converters is presented, the performance investigated and the experimental results shown.

Architecture of Fault-Tolerant Controller for Multi-Level Converter

Comparison of Fault Tolerant Controller Architectures.

Figure 2:
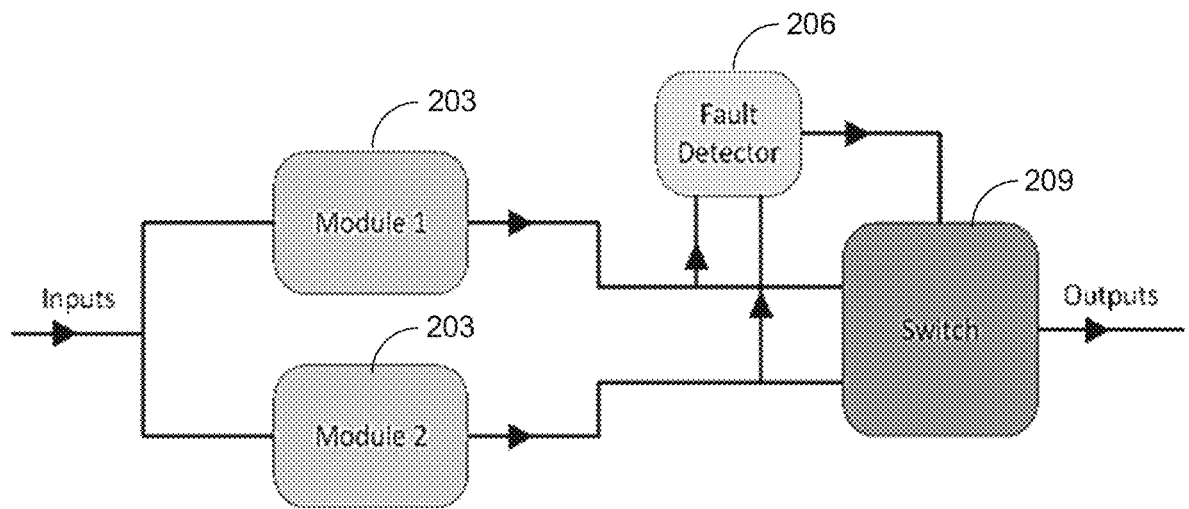
FIGS. 2 and 3 are schematic diagrams illustrating examples of architectures of dynamic redundancy and static redundancy, respectively, in accordance with various embodiments of the present disclosure.

Fault-tolerant controller architectures can be categorized into static, dynamic or a combination of both controllers. FIG. 2 is a schematic diagram illustrating an architecture of dynamic redundancy, which demonstrates the dynamic (standby) topology, in which there is a main controller, several spare modules 203 and a fault-detection circuit 206. Fault detection can be embedded in modules 203 or there can be a separate circuit 206 for the faults. After detection of the fault, a fail-over signal would trigger the switch 209 to route the output signals from the faulty module to the functional module.

Figure 3:
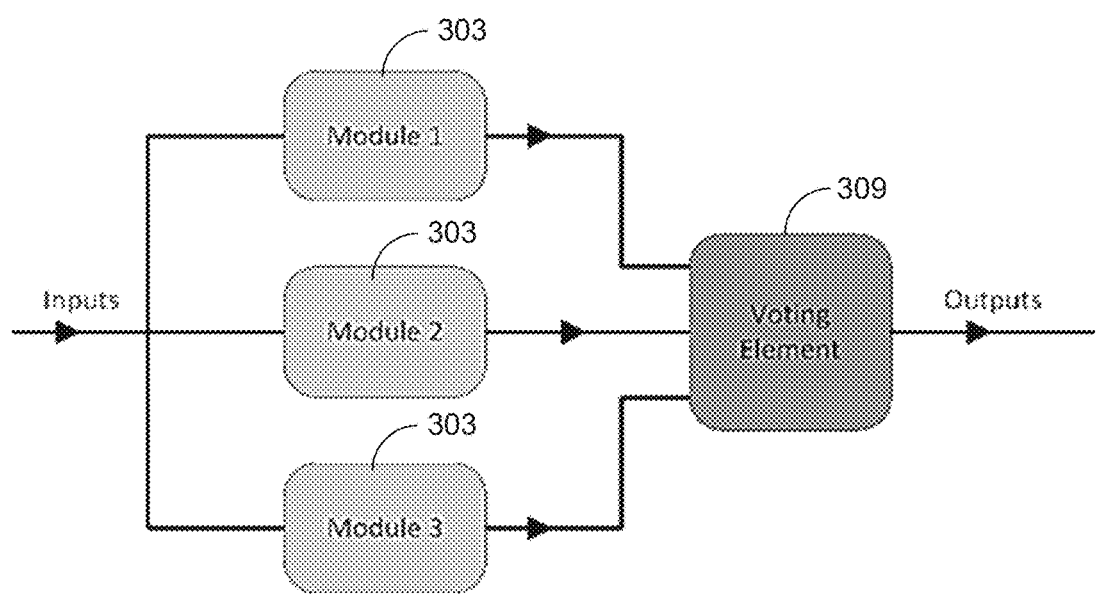

FIG. 3 is a schematic diagram illustrating an architecture of static redundancy. In static redundant controllers, each module 303 is active and is generating output signals. There can be a Voting Element (VE) 309 which compares the result and chooses the majority result. In applications like network servers, voting is done on data variables that can be implemented by logic circuits. In power electronics, outputs are in the form of electrical signals which are function of time (e.g., PWM signals with variable duty ration), therefore comparison of the outputs may not be instantaneous, may require huge amount of hardware resource for implementation or may need precise synchronization between the signals and the reference. In contrast, dynamic controllers have better availability compared to static controllers using the same amount of resource. Therefore, the proposed controller can be based on the dynamic architecture.

Modular Fault-Tolerant Controller Architecture for Multi-Level Converters.

A regular multi-level converter might have hundreds of modules in each leg. That means any hardware added in each module would be multiplied by hundreds at the end product. In voting redundancy, implementation of VE utilizes lots of elements and can also include a high speed network link between modules and the VE. Therefore, implementing the redundancy based on the voting method might not be the perfect choice for multi-level converter application.

Figure 4:
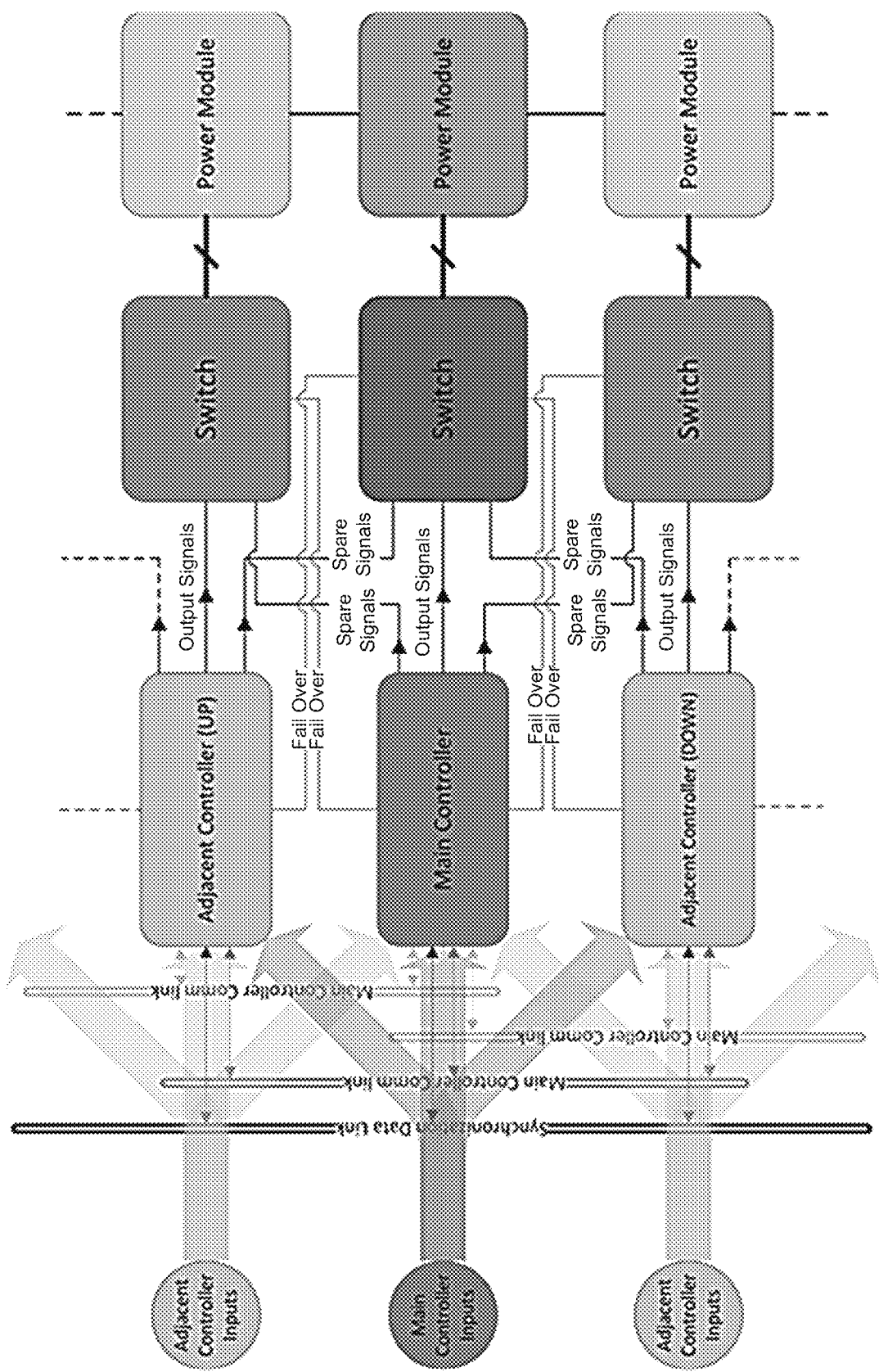
FIG. 4 is a schematic diagram illustrating an example of a fault-tolerant controller architecture for a cascaded multi-level converter, in accordance with various embodiments of the present disclosure.

On the other hand, a standby method only needs a fail over switch to be added to the regular converter block. This switch can easily be implemented by tri-states buffers. Fault detection can be implemented internally by each module and based on the data being shared between the adjacent controllers. FIG. 4 is a schematic diagram illustrating an architecture of an exemplary fault-tolerant controller for cascaded multi-level converter.

If any fault is detected, a fail-over signal can trigger the switch to route the output signal from a different module. Each module can include an internal fault detection (or built-in self-test) circuit ($F_{BIST}$) and can communicate with adjacent modules to share the result of the control signals and the value of input signals it has measured. This data can be judged by other modules as a health indicator of the main (output comparison) module ($F_{OC}$). If no signal is received from the main module, it can indicate that there is a silent failure in a time-out module ($F_{TO}$). The other auxiliary modules can share the result of the fail detection. This helps in the fail-over situation to decide which auxiliary module is better to take over the control.

Figure 5:
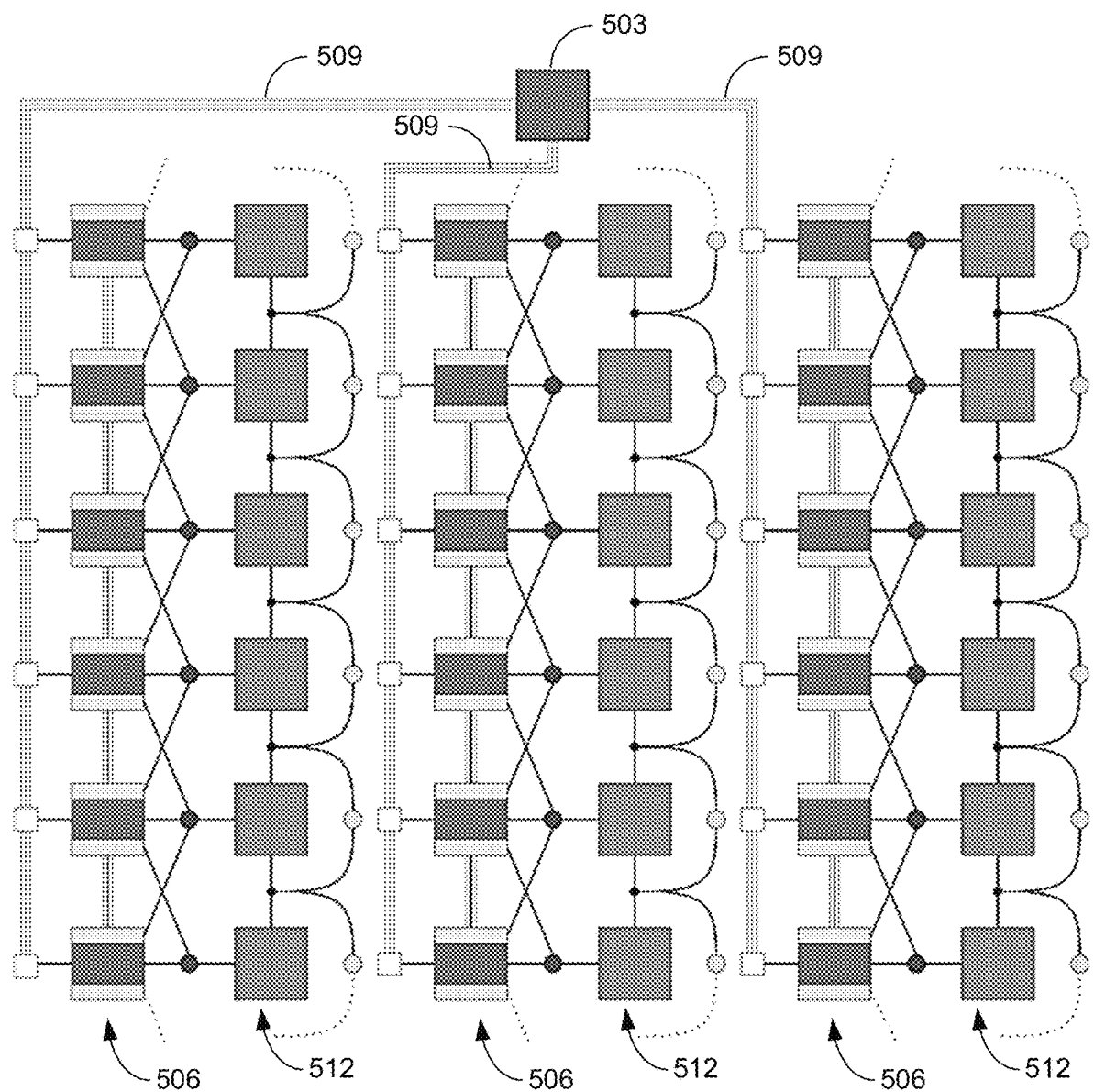
FIG. 5 is a schematic diagram illustrating an example of connections between distributed controllers in a system, in accordance with various embodiments of the present disclosure.

FIG. 5 is a schematic diagram illustrating an example of connections of distributed controllers in the system, which demonstrates the connection of the master controller 503 to the slave controllers 506. Control variables in the proposed controller can be either global or local. The global variables can be gathered by the master controller (synchronizer) 503 in order to perform high level control blocks. The local variables can be acquired by the slave controllers 506 and can be shared with the master controller 503 through the communication link 509. After completion of the high level control modules, the result can be broadcasted to all slave controllers 506 for implementing the low level control procedures on the converter modules 512.

Fault Detection and Handling in Controller.

There are different ways of detecting faults in the system. One method can use built-in fault-detection circuits in order to find error in each module. The built-in self-test (BIST) can compare the operating points of the system with pre-defined values and signal errors whenever they are not matching. One example would be an error detection circuit for the power switches (IGBT) in which the state of the switch is compared to the gate voltage level to find a fault.

Another method can use a time-out (TO) detection which detects any latency in response from other modules. Lack of a signal in the determined period can be a sign of failure in the controller module. Watch dog timers work based on this principle and can detect faults in microprocessors.

Figure 6:
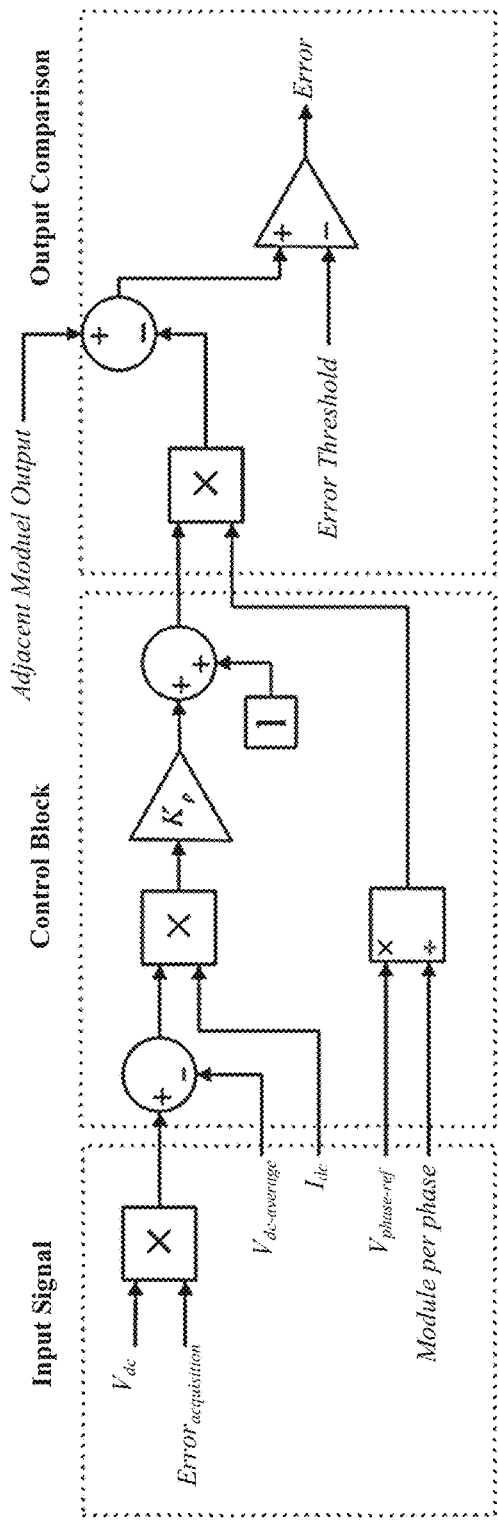
FIG. 6 is a schematic diagram illustrating an example of fault detection circuitry, in accordance with various embodiments of the present disclosure.
Figure 7:
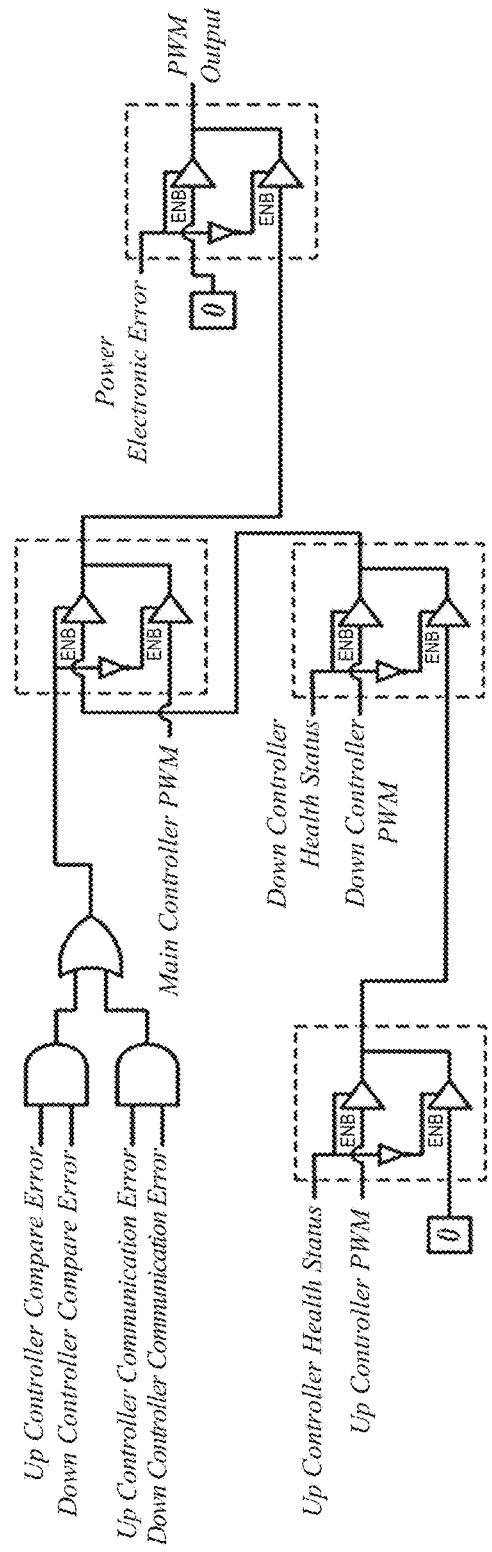
FIG. 7 is a schematic diagram illustrating an example of fail-over circuitry, in accordance with various embodiments of the present disclosure.

A further method can use comparison of the output results in separate modules. FIG. 6 is a schematic diagram illustrating an example of fault detection circuitry based on output result comparison. For this, the same inputs are fed to the controllers (hardware or software) and the output results are compared. Any mismatch at the outputs can be a sign (or indication) of failure in one of the modules The output of the fault detection circuitry (FIG. 6) can be fed to a fail-over circuit. FIG. 7 is a schematic diagram illustrating an example of fail-over circuitry for the proposed controller. If a failure is detected by both adjacent controllers, it can mean that there is a common failure in the system. Therefore the output needs to be switched to either of the adjacent controllers. The selection between two adjacent controllers can be made based on the health status of those controllers with the priority given to the lower controller. In this case, if both adjacent controllers are functional, the lower controller takes the control. Otherwise, the functional controller is in charge of the failed controller.

Mathematical Model of the Controller.

The proposed controller can be designed to handle a limited amount of failure and function without interruption. The performance model helps in identifying the cases in which the controller is available. This mathematical model may be helpful in performing reliability analysis based on Monte Carlo simulations. The soft error of the controller can be a combination of the errors in the controller including the built-in self-test ($F_{BIST}$), output comparison ($F_{OC}$) and time-out ($F_{TO}$) error matrices. This can be expressed as:

$$F_{SOFT_{i,1}} = (F_{BIST_{i,1}}) \vee (F_{OC}) \vee (F_{TO_{i,1}}).$$

Thanks to the fault-tolerant algorithm, a single error in the main controller or the adjacent controllers may not trigger failure in the output result. The final status of the controllers can be defined in the controller availability matrix (CAM) as below:

$$CAM_{i,1} = \begin{cases} 0 & \text{if } [(F_{SOFT_{i-1,1}} \wedge F_{SOFT_{i+1,1}} \wedge F_{SOFT_{i,1}}) = 1] \\ 1 & o.w. \end{cases}$$

The availability of a converter module can be based on the availability of the controller and power switches. Therefore:

$$F_{MODULE} = (\overline{CAM}) \vee (F_{POWER}).$$

The number of failed modules in each phase of converter ($U_{PHASE}$) shouldn't be higher than the allowed maximum failure per phase.

$$U_{PHASE} = \sum_{i=1}^{n} F_{MODULE_{i,1}} > \text{max allowed failure}$$

This value is defined by the voltage rating of the power module and the grid voltages. If this criteria cannot be met, the converter may not function anymore and will be unavailable.

The state of the fail-over circuit (FIG. 7) can be based on the faults in the power switches and the controllers. Therefore, power switch fail-over states ($S_P$) and controller fail-over states ($S_C$) can be defined as follows:

$$S_P = F_{POWER}$$

$$S_{C_{i,1}} = \begin{cases} 0 & \text{if } (\overline{F_{SOFT_{i,1}}} = 1) \\ +1 & \text{if } [(\overline{F_{SOFT_{i-1,1}}} \wedge F_{SOFT_{i,1}}) = 1] \\ -1 & \text{if } [(\overline{F_{SOFT_{i+1,1}}} \wedge F_{SOFT_{i,1}} \wedge F_{SOFT_{i-1,1}}) = 1] \end{cases}$$

Reliability of the whole controller system can be based on the individual units used in its design. The first step of a reliability assessment is to find the failure rate of each unit. It may not be possible to find the exact rates, but it is possible to use statistical methods to provide close predictions. Reliability in electronic components is variable by time and it can be formulated by an exponential function, e.g.:

$$R(t) = \exp\left(-\sum_{i=1}^{n} \lambda_i t\right) = e^{-\lambda t}$$

where $\lambda = \lambda_1 + \lambda_2 + \lambda_3 + \ldots + \lambda_N$

R(t) is the reliability of the system and $\lambda$ is the failure rate. Since the reliability of components in series would be multiplied, the final failure rate can be the summation of all failure rates. Two methods can be used for finding the failure rate. First, a life testing method tests samples of components for a period of time and tries to fit the failure curve of the device. This method is applicable for complicated systems (e.g., ASICs) which have unique functionality and result of other tests can't be expanded for the device. Silicon manufacturers usually do this test for a large sample of specific design and publish the result for customer use. In this method, the standard failure in time (FIT) can be defined as following statistical formula:

$$\lambda = \sum_{i=1}^{\beta} \left( \frac{x_i}{\left(\sum_{j=1}^{k} TDH_j \times AF_{ij}\right)} \right) \times \frac{M \times 10^9}{\sum_{i=1}^{\beta} x_i}$$

where:

$\lambda$ is the failure rate in FITs (number fails in $10^9$ device hours);

$\beta$ is the number of distinct possible failure mechanisms;

k is the number of life tests being combined;

$x_i$ is the number of failures for a given failure mechanism, i=1, 2, ... $\beta$;

$TDH_j$ is the total device hours of test time for life test j, j=1, 2, ... k;

$AF_{ij}$ is the acceleration factor for appropriate failure mechanism i, j=1, 2, 3, ... k; and $M = X^2_{(\alpha, 2r+2)}/2$, where:

$X^2$ is the chi square factor for 2r+2 degrees of freedom;

r is the total number of failures ($\Sigma x_i$); and $\alpha$ is the risk associated with CL between 0 and 1.

Second, an empirical method can be used to predict the lifetime of the components. There are several standards like MIL-HDBK-217, Bellcore/Telecordia, RDF2000, etc. that have tested a wide range of standard components throughout the time and gathered the failure rates. The result from both methods can be extended to different temperatures than the test bed using Arrhenius equation:

$$AF = \exp\left(\frac{E_a}{k}\left(\frac{1}{T_{use}} - \frac{1}{T_{stress}}\right)\right)$$

where:
AF is an acceleration factor;
$E_\alpha$ is the thermal activity energy;
k is the Boltzmann's constant;
$T_{use}$ is the use temperature; and
$T_{stress}$ is the life test stress temperature.

Figure 8:
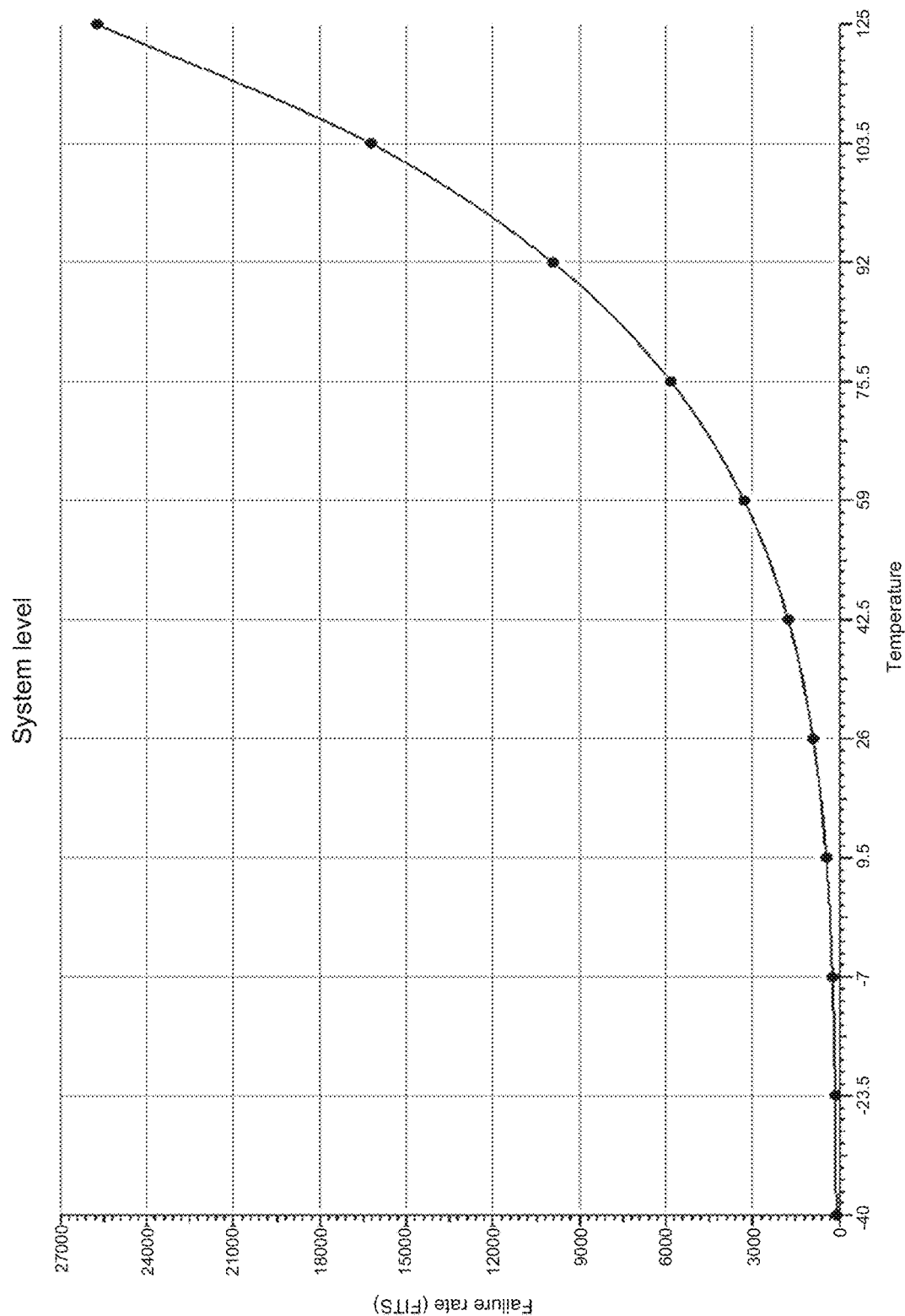
FIG. 8 is a plot illustrating an example of predicted failure rate of the controller card with respect to temperature, in accordance with various embodiments of the present disclosure.

There are different softwares available to find failure rates and do reliability assessments. For example, Isograph™ Reliability Workbench (RWB) has been used to predict failure rate of the control cards using the MIL-HDBK-217 standard and failure rates from vendor datasheets. The resulting predicted failure rate of the controller card with respect to temperature is shown in FIG. 8.

Figure 9:
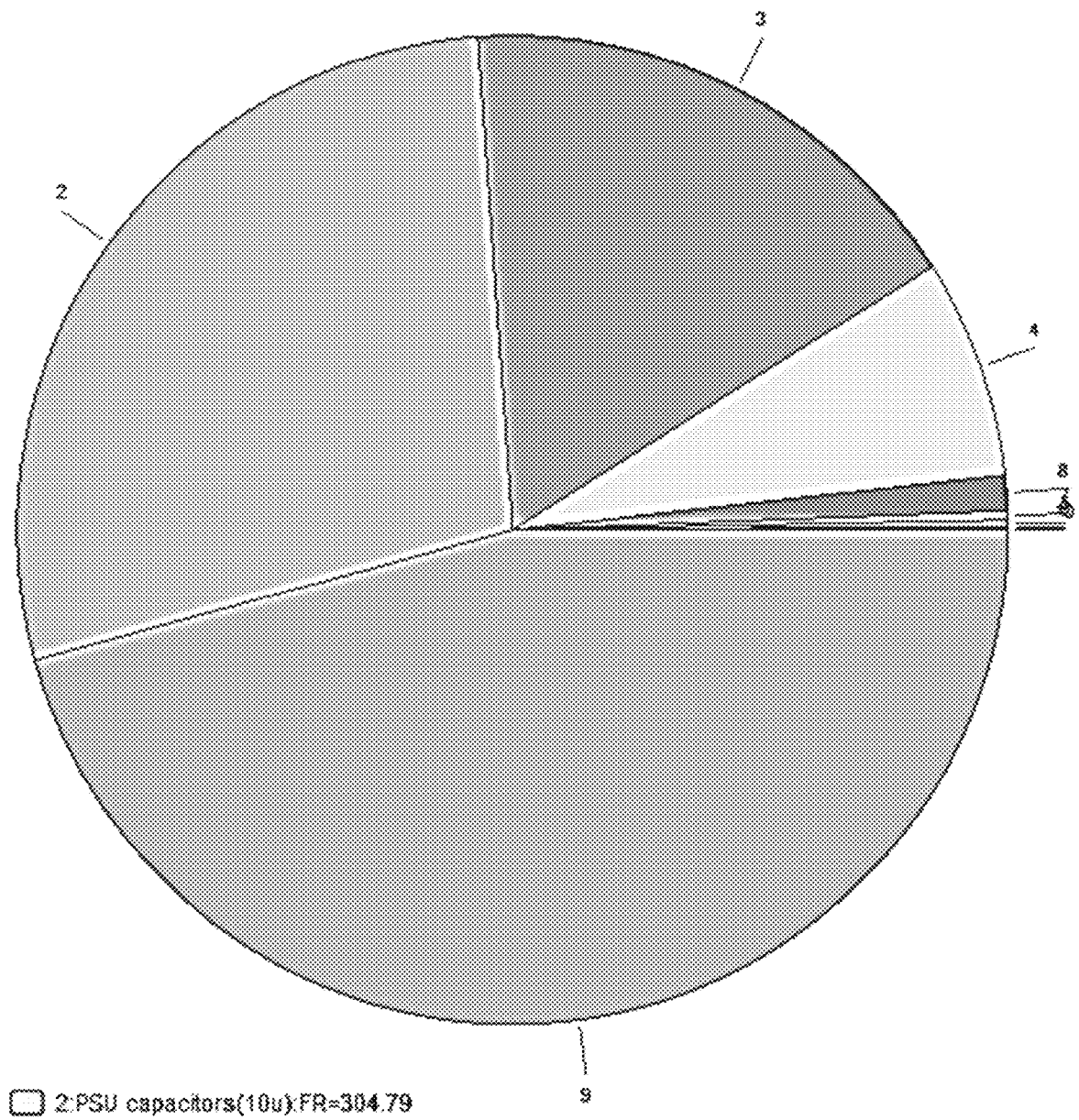
FIG. 9 is a pie chart illustrating an example of the contribution of all components on failure rate, in accordance with various embodiments of the present disclosure.

FIG. 9 is a pie chart illustrating the contribution of all components in the failure rate. As can be seen, capacitors (e.g., 2, 3, 9) have the highest contribution to failure. This may be attributed to the chemical properties of the dielectrics used in the capacitors. Semiconductors have a much lower failure rate than other passive components thanks to the advancement in the fabrication process.

Reliability Analysis of the Distributed Controller.

The mathematical tool for modeling the reliability of a system is Markov chain. A good detail of Markov chain modeling can be found in "Techniques for Modeling the Reliability of Fault-tolerant Systems with the Markov State-space Approach" by R. Butler and S. Johnson, (NASA Langley Reseach Center, Hampton, Va.) and *Modeling for Reliability Analysis, Markove Modeling for Reliability, Maintainability, Safety and Supportability Analysis of Complex Computer Systems* by J. Pukite and P. Pukite (IEEE Press Series on Engineering of Complex Computer Systems), both of which are hereby incorporated by reference in their entireties. Using Markov chain, it is possible to model a continuous time system with variable reliability (e.g., exponential probability) in a discrete system with fixed rates. This makes the modeling easier for demonstration and computer simulation. Using a state diagram, it is possible to demonstrate the states and transition rates for controllers.

Figure 10:
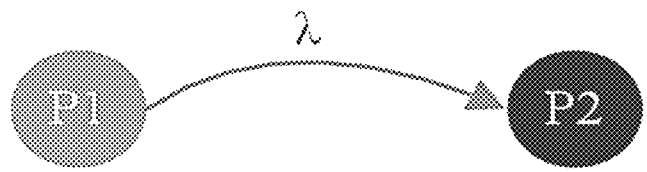
FIGS. 10, 11 and 12 are state diagrams illustrating examples of a modular multi-level converter (MMC) without any bypass capability, with bypass capability, and with fault tolerant controllers respectively, in accordance with various embodiments of the present disclosure.

In a modular multi-level converter (MMC) without any bypass capability, any failure in a module can lead to unavailability. FIG. 10 is a state diagram illustrating the MMC without bypass capability. In this case, $\lambda_{MMC}$ is the summation of failure rates for all modules. Availability of this converter can be very low since a large number of modules are connected in series.

Figure 11:
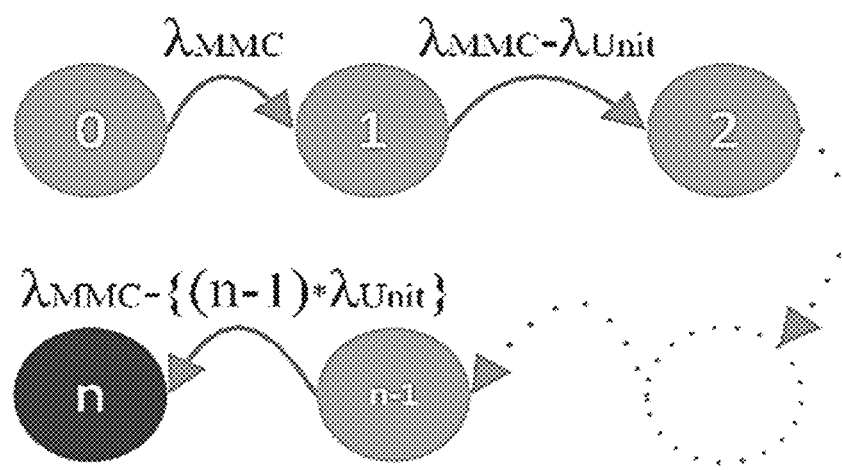
Figure 12:
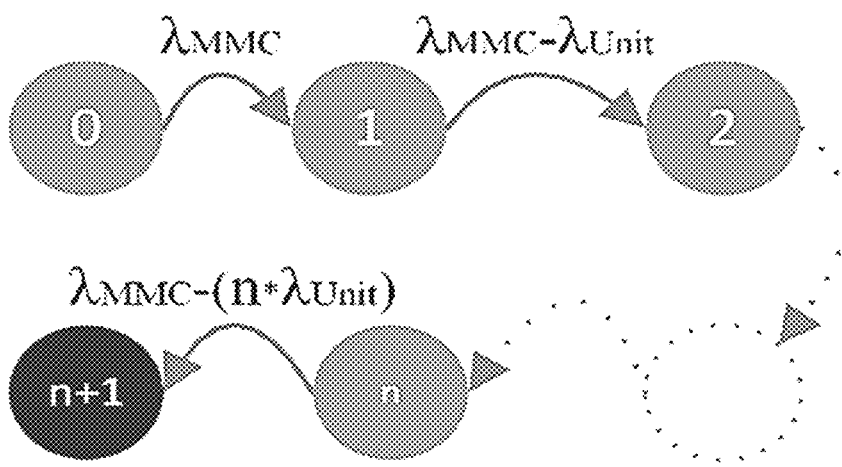

In a MMC with bypass capability, reliability is higher and failure depends on the maximum allowable module failure in the converter ($n^{th}$ module). Therefore, the converter remains operable unless it reaches the $n^{th}$ state in the faulty leg. FIG. 11 is a state diagram illustrating the MMC with bypass capability. With the fault-tolerant controller installed on the converter, an extra module can fail before failure in the whole system. FIG. 12 is a simplified state diagram illustrating the MMC with fault tolerant controllers. Whenever a fault happens in one module, an adjacent controller can take control of that module and in this case will not to fail.

Figure 13:
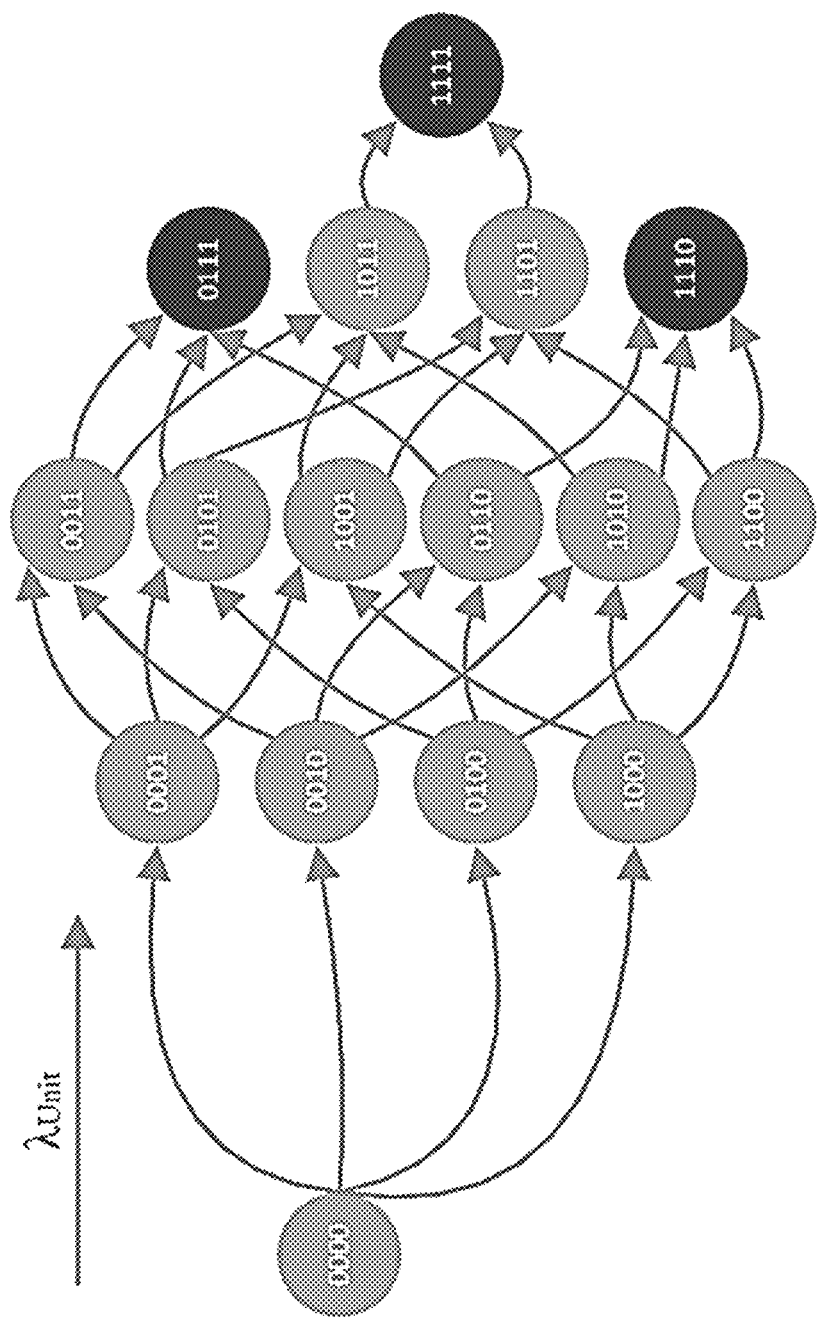
FIG. 13 is a state diagram illustrating an example of precise Markov model for a controller, in accordance with various embodiments of the present disclosure.
Figure 14:
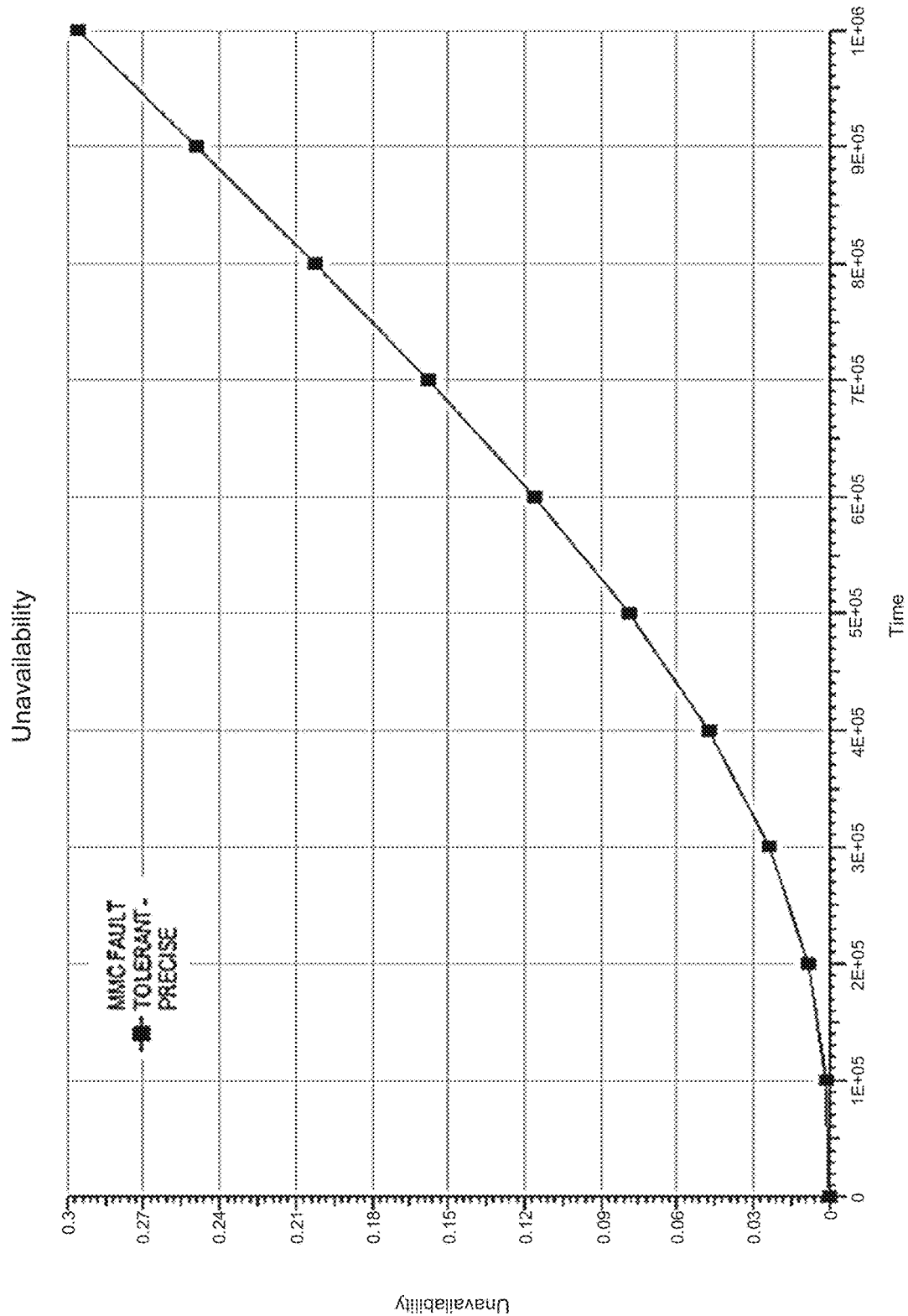
FIG. 14 is a plot illustrating an example of unavailability for the lifetime of the controller with precise Markov model, in accordance with various embodiments of the present disclosure.

The precise Markov model for the proposed controller is represented in FIG. 13. It is assumed that there are 4 modules in each leg and that a maximum of one module can fail before reaching the unavailability state. Each transition would have a failure rate equal to the single controller failure rate ($\lambda=\lambda_{unit}$). It can be seen that the precise method comprises lots of transitions even for a simple 4 module converter. In order to show the advantage of the controller, the Markov model of the converter has been simulated using the Isograph™ reliability workbench and a failure rate of the unit based on the analysis of the previous session at 25° C. has been used (A=9.04*10$^{-7}$). FIG. 14 is an unavailability plot for the lifetime of the proposed controller (life time=10$^6$ hours), which shows the result of the unavailability analysis for the controller in the life time of the system.

Implementation and Experimental Result

Figure 15:
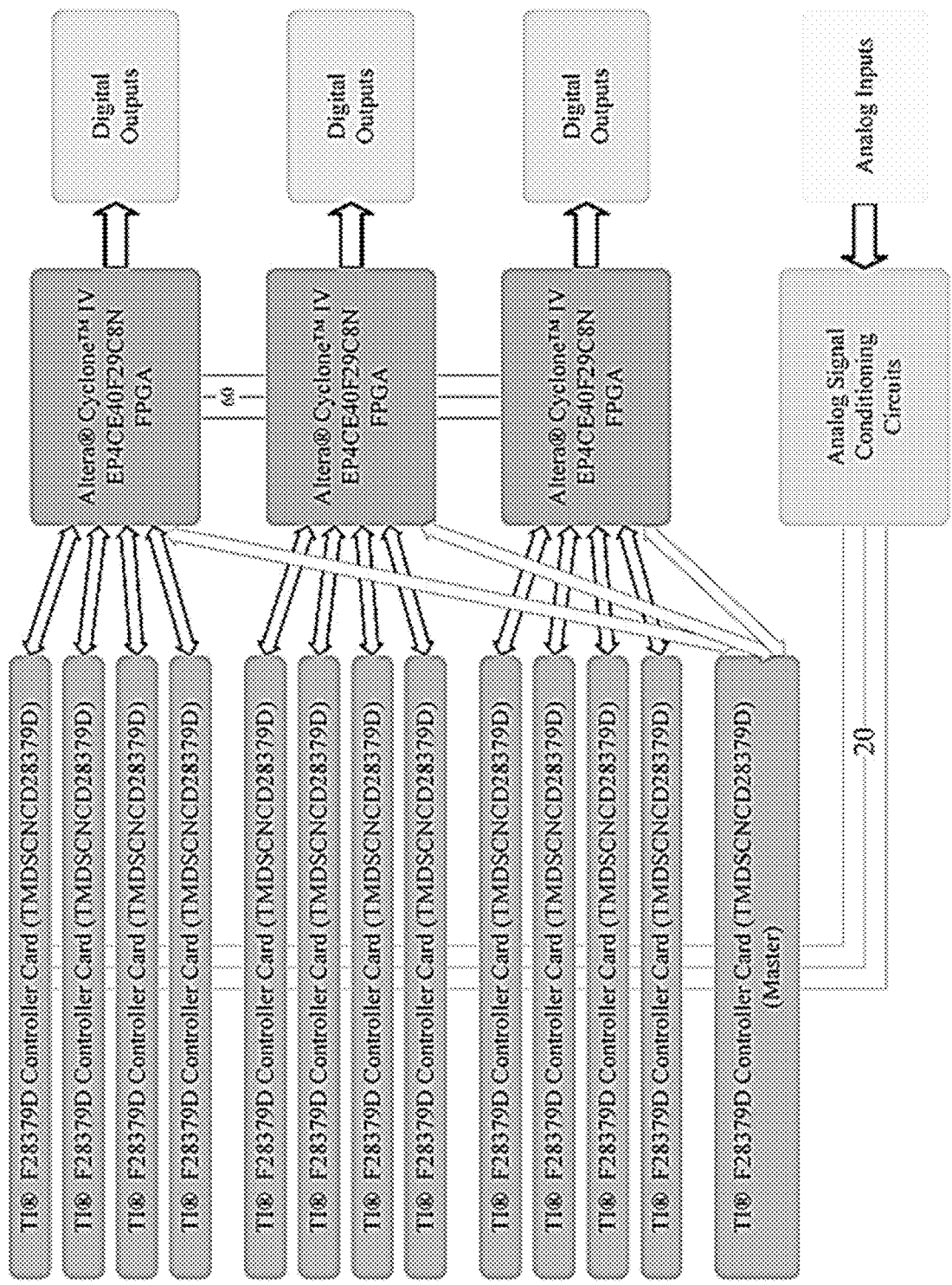
FIG. 15 is a diagram illustrating an example of a controller testbed used for evaluating the performance of the controllers, in accordance with various embodiments of the present disclosure.
Figure 16:
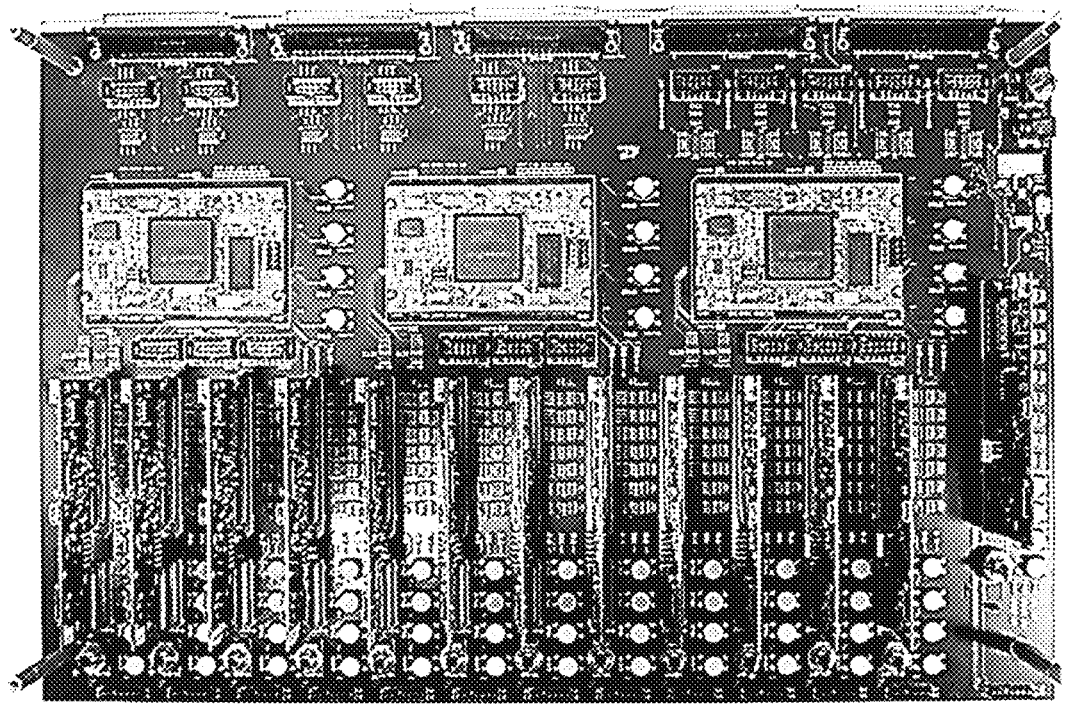
FIGS. 16 and 17 are images showing an example of the distributed fault tolerant controller testbed and the interconnection with the cascaded H-bridge converter, respectively, in accordance with various embodiments of the present disclosure.

An experimental setup has been designed to demonstrate the benefits of using fault-tolerant controller in cascaded multi-level converters. FIGS. 15 and 16 show a diagram of the controller testbed used for evaluating the performance of the controllers, and an image of the distributed fault tolerant testbed, respectively.

Figure 17:
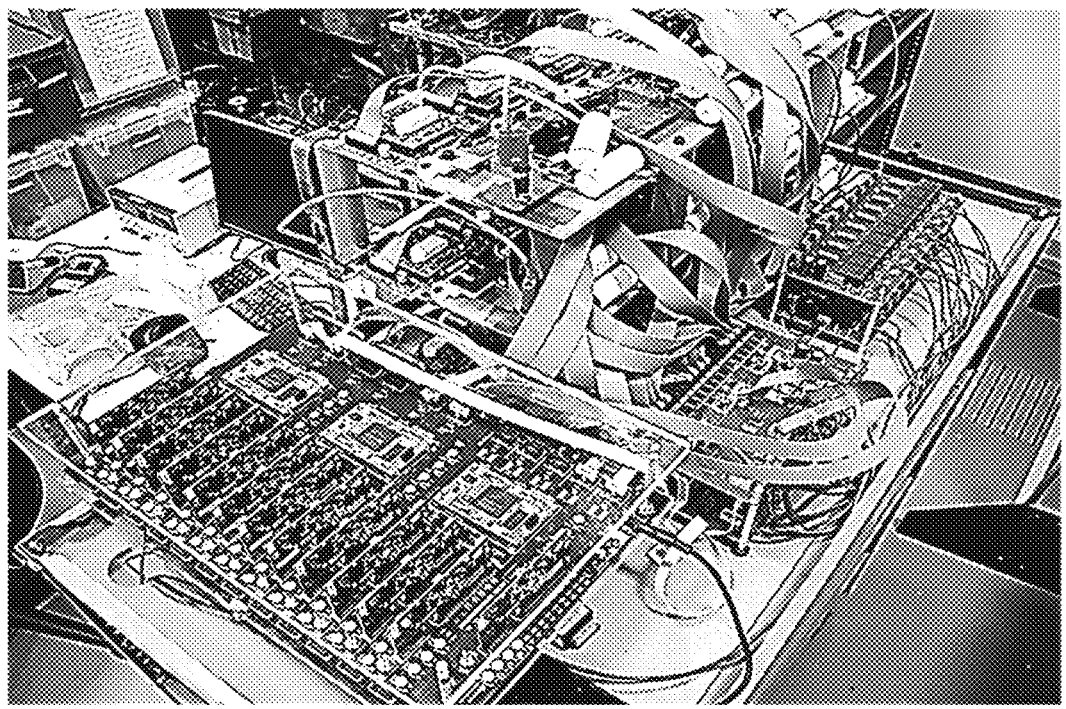

In order to achieve experimental result, a cascaded H-bridge converter with 4 modules per phase was used as the multi-level converter. FIG. 17 is an image of the fault-tolerant controller inter-connection with the cascaded H-bridge converter. The specification of the setup is simplified in Table 1. The principles of control for the cascaded H-bridge converter can be found in "Control of High-frequency Isolated Modular Converter" by N. Yousefpoor, et al. (*IEEE Transactions on Industry Applications*, vol. 51, no. 6).

TABLE 1

Specification of the experimental setup for evaluation of the fault-tolerant controller
Specification of experimental setup

| | |
|---|---|
| Controller card | TMDSCNCD28379D |
| FPGA card | EP4CE40F29C8N |
| Converter type | Cascaded H-bridge with isolated DC/DC output |
| Number of modules per phase | 4 |
| Grid inductance (Ls) | 5 mH |
| Module capacitance (Cm) | 6800 μF |

The role of the Altera™ FPGA at the output was to implement the fault detection and fail-over circuitry. It was much easier to inject a fault using programmable logic. The output of the controller cards were connected to the FPGA and all of the slave controllers were synchronized with a master controller.

Figure 18:
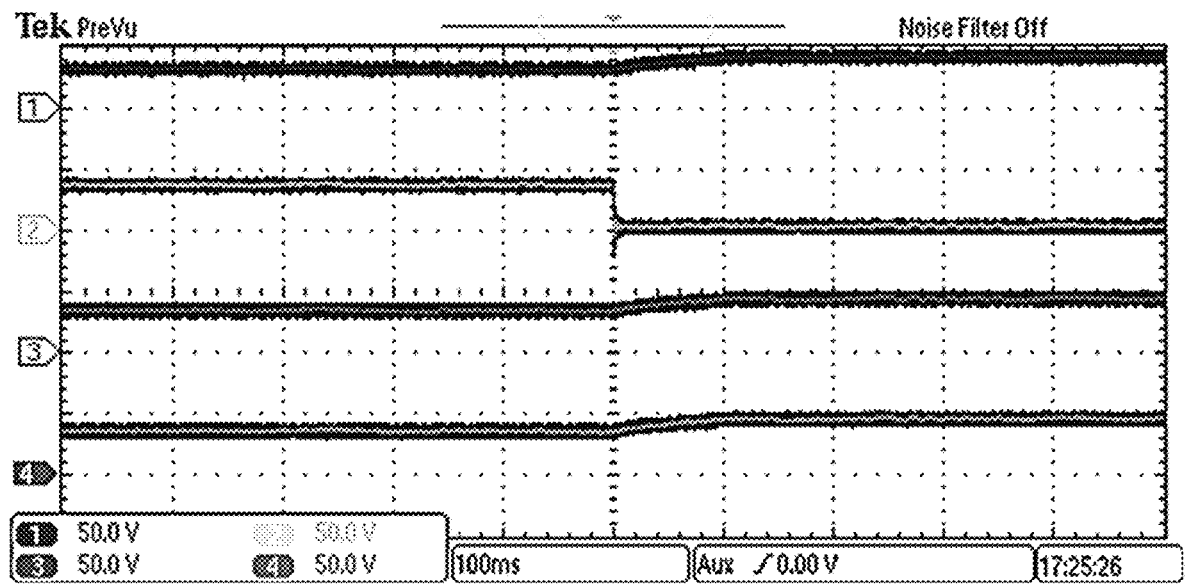
FIGS. 18-23 illustrate examples of measurements during failure testing, in accordance with various embodiments of the present disclosure.
Figure 19:
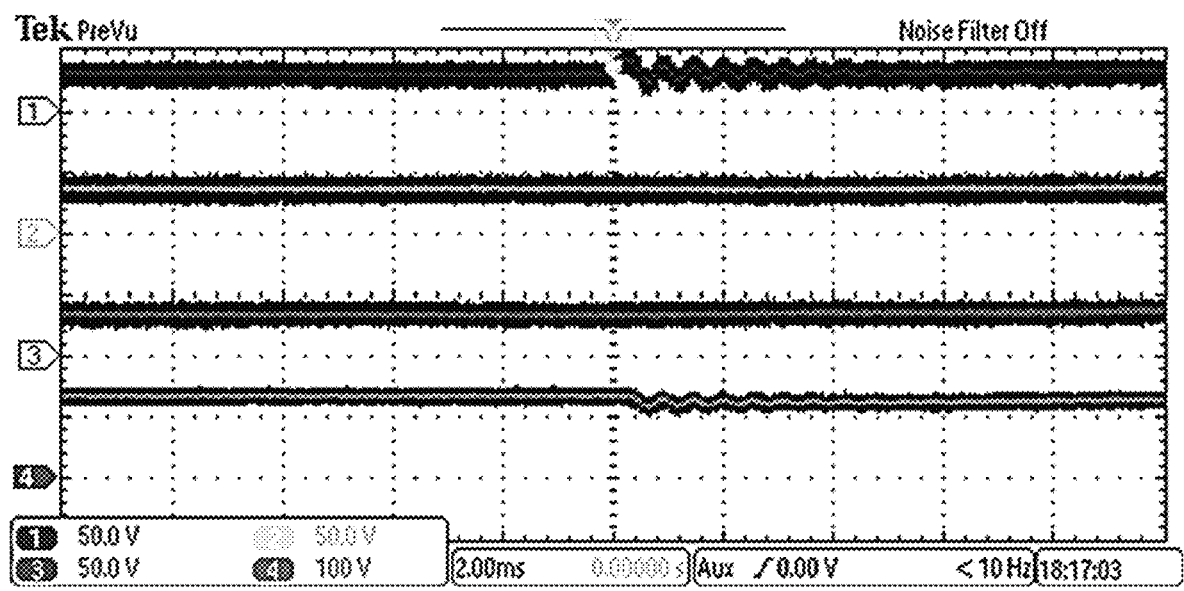
Figure 20:
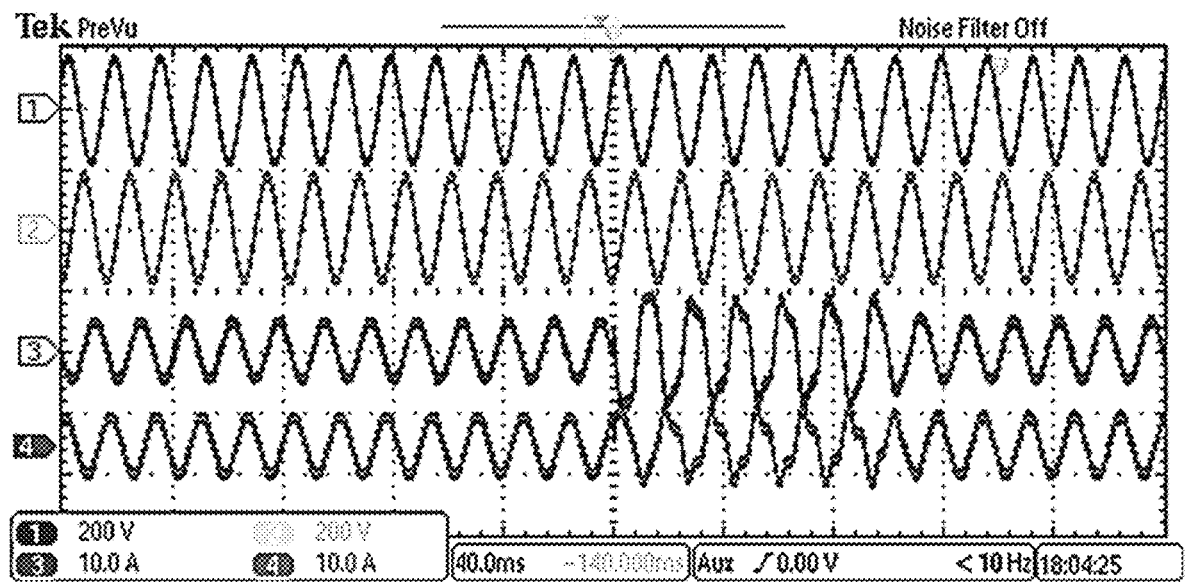

Failure testing for this controller can be classified in three modes. In the first mode (mode 1), the failure of the power module and handling by control mechanism has been investigated (See FIGS. 18 to 20). The failed module has to be bypassed by the controller and the voltage of the other modules should be adjusted by the controllers. FIG. 18 illustrates capacitor voltages at the time of failure in power electronic (mode 1). The DC grid can be configured to see the smallest change in the voltage value when fault happens. FIG. 19 illustrates average capacitor voltages in each phase of the converter. The grid current variation during voltage boost needs to be in the range, otherwise the circuit breaker would trip. This has been investigated in FIG. 20, which illustrates grid voltages and currents at power module failure.

Figure 21:
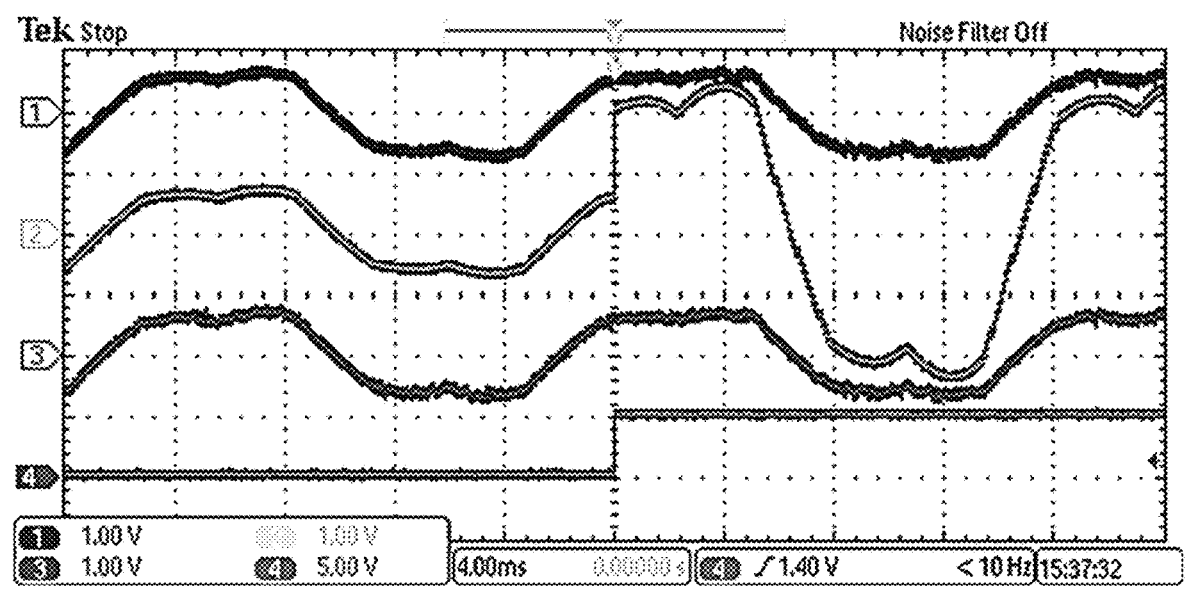
Figure 22:
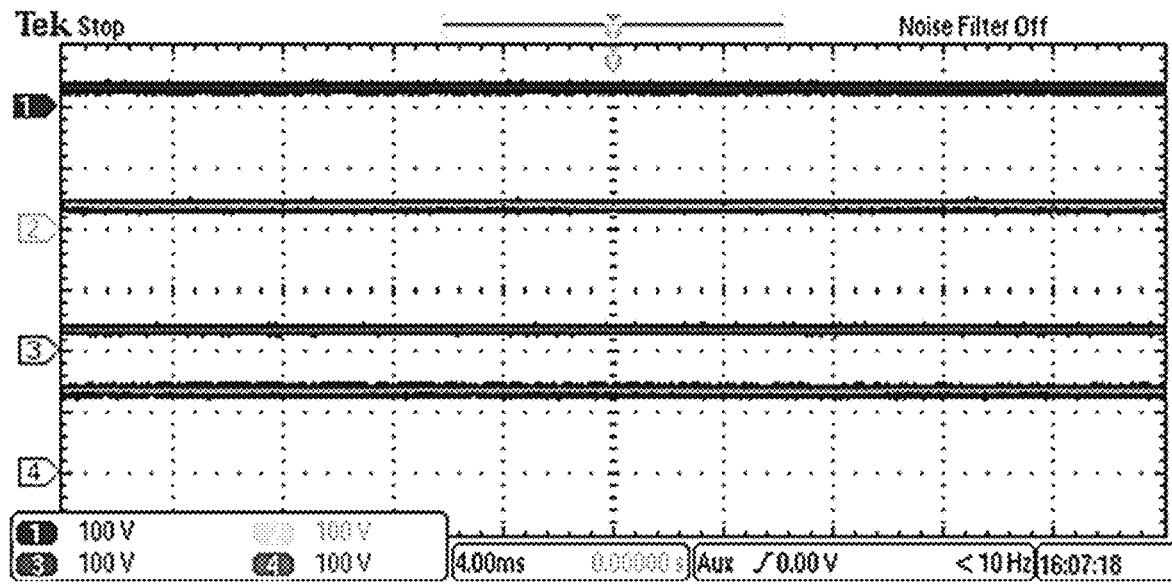
Figure 23:
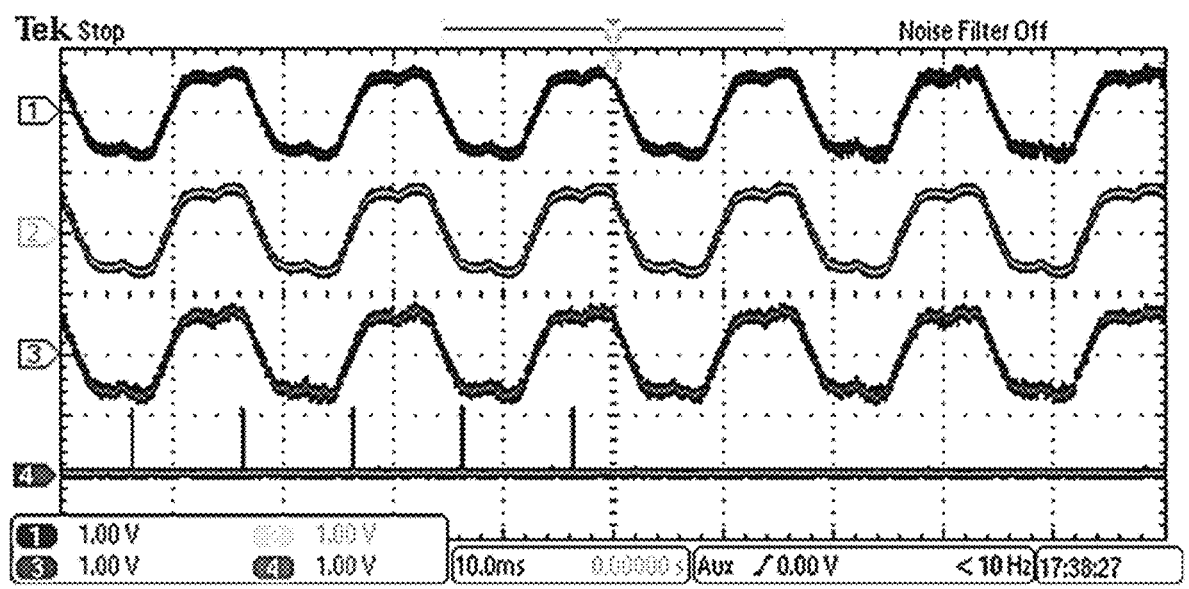

In mode 2, voltage measurement unit failure has been tested. The error can be detected by comparing the output of the control block. Any differentiation between the main controller and the adjacent controller can trigger the error flag. FIG. 21 illustrates controller outputs at measurement failure (mode 2). Since these failures are handled inside the controllers, the power modules may not see any changes in the voltages. FIG. 22 illustrates average capacitor voltages in each phase at measurement sensor failure (mode 2). The last mode (mode 3) of testing is based on the time out method. Whenever communication link is lost or the controller is not functioning, there would be no update from the controllers and it would trigger the communication fault flag. FIG. 23 illustrates controller outputs at communication link failure (mode 3).

The proposed controller was designed to handle a single point of failure in the converter system. Any failure in the controller module can be handled be the adjacent controllers. The only point where redundancy was not considered was the master controller and the communication link. In order to avoid a single point of failure, both of these areas can be made redundant. Alternatively, this potential problem can be solved using grid connected controllers in which a 2D array of controllers exist in the converter system. One of the controllers can act as the master controller and the other slave controllers are synchronized through the grid network.

A state-of-the-art controller architecture for controlling a modular multi-level converter (MMC) family will now be presented. By using this controller architecture, a single point of failure in the power converter, controller board or the communication network does not interrupt the functionality of the system. In order to achieve that, a two-dimensional array of controllers can be formed to handle the MMC. In this architecture, a selected master controller can synchronize the slave controllers. In addition, adjacent slave controllers can check the internal functionality of each other. In case of a failure detection, the failed component can be isolated from system and the converter can continue its operation without interruption. The following disclosure includes a synchronization mechanism for slave controllers, master controller selection, and presents experimental results for the proposed controller.

The challenge of designing fault-tolerant control systems dates back to the invention of microprocessors. Technology developments made it possible to build highly integrated circuits (IC) and use them in computational applications. Functionality of microprocessors is based upon physical principles, which means they are subject to aging effects, transient disturbances and their lifetime is limited. Other factors like software bugs may affect their performance and introduce aging effect in the system as well. In critical systems, it is not acceptable to have interruption in the operation of system or miscalculation in mathematical formulas. All of these will cause achieving different output result than expectations by the developers. In fault-tolerant controller design, different techniques have been used to lower the probability of these faults and their effects on the system. In all of these techniques, redundant components and software blocks have been used to compensate for failure in the single components. The goal is to find the failure in the system, bypass it, and fail over from the damages module to the functioning modules.

There are two main mechanisms for detection and handling of faults. In the static redundancy architecture, parallel systems can work together and the output of the systems can be fed in to voting elements. Voting elements will compare the results and chose the majority output as the final result. This method of redundancy is beneficial for data processing systems (like server computers). Another method is dynamic redundancy in which there is a failure detection block for checking the functionality of the module. In case of a failure detection, a fail-over to another spare module would happen. Therefore, the failure can be bypassed and system can continue its operation. Dynamic redundancy can be the base for fault-tolerant controllers for cascaded multi-level converters.

Figure 24:
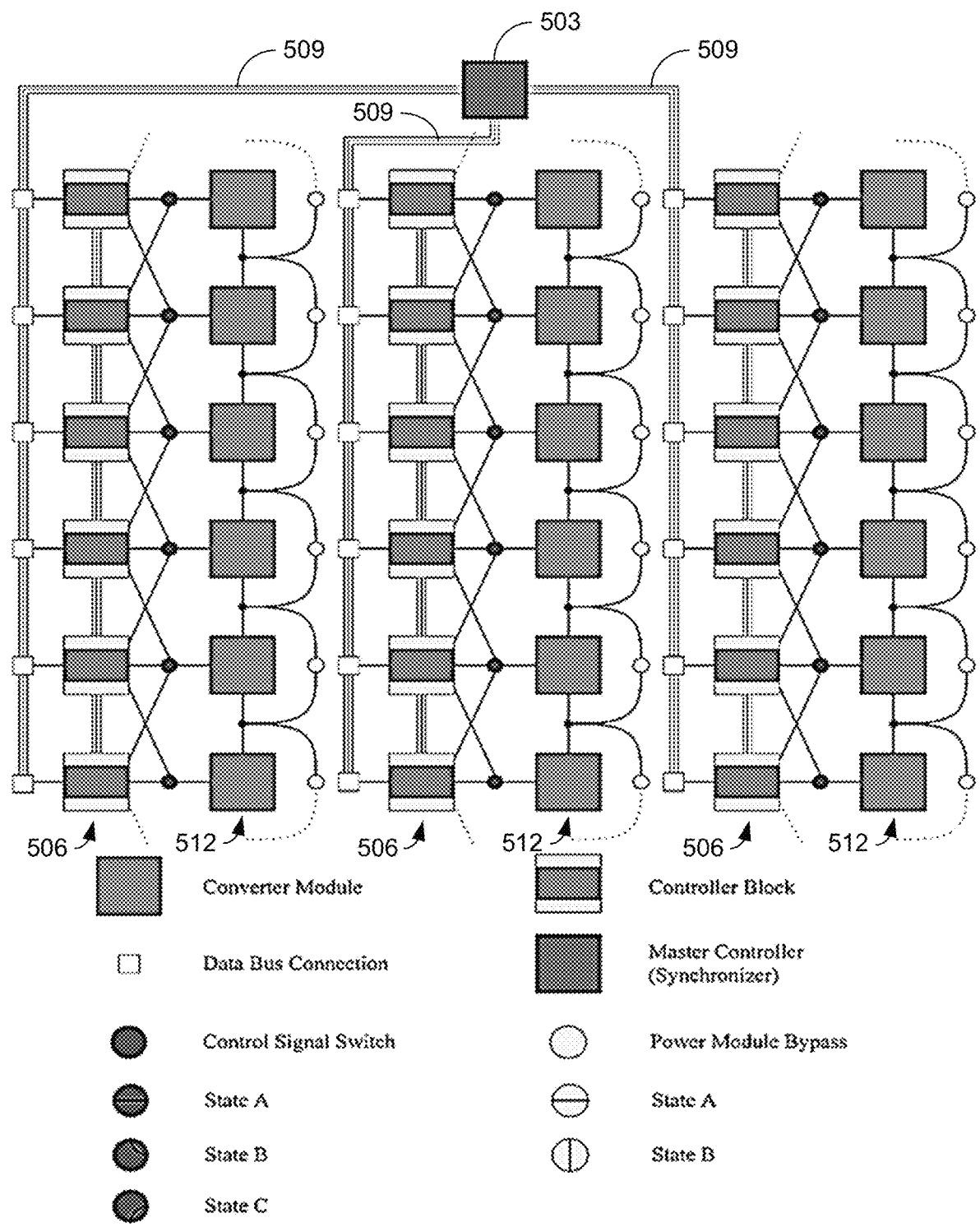
FIG. 24 is a schematic diagram illustrating an example of a fault-tolerant controller architecture for MMCs, in accordance with various embodiments of the present disclosure.

FIG. 24 is a schematic diagram illustrating an example of an architecture of a fault-tolerant controller for MMCs. In this architecture, there is one dimensional controller array for each phase and all of slave controllers 506 in each array are being synchronized by the master controller 503. Slave controllers 506 check the functionality of the adjacent modules and in case of failure in the neighbor module, operational module will take control of the failed modules. In this architecture, failure in the master controller 503 or the communication network 509 will fail the whole system. In order to avoid single point of failure in this architecture, the master controller 503 and the communication network 509 must have redundancy. This will complicate the controller design and increase the cost of final system. The idea of the proposed controller derived from the method where a school of fish or flock of birds work together to avoid predators. In this team work, multiple eyes act as sensors for the group and signal other members to avoid the threats. In the new proposed architecture, a two-dimensional controller matrix is used to handle low level and high level control blocks which will be reviewed in detail.

Figure 25:
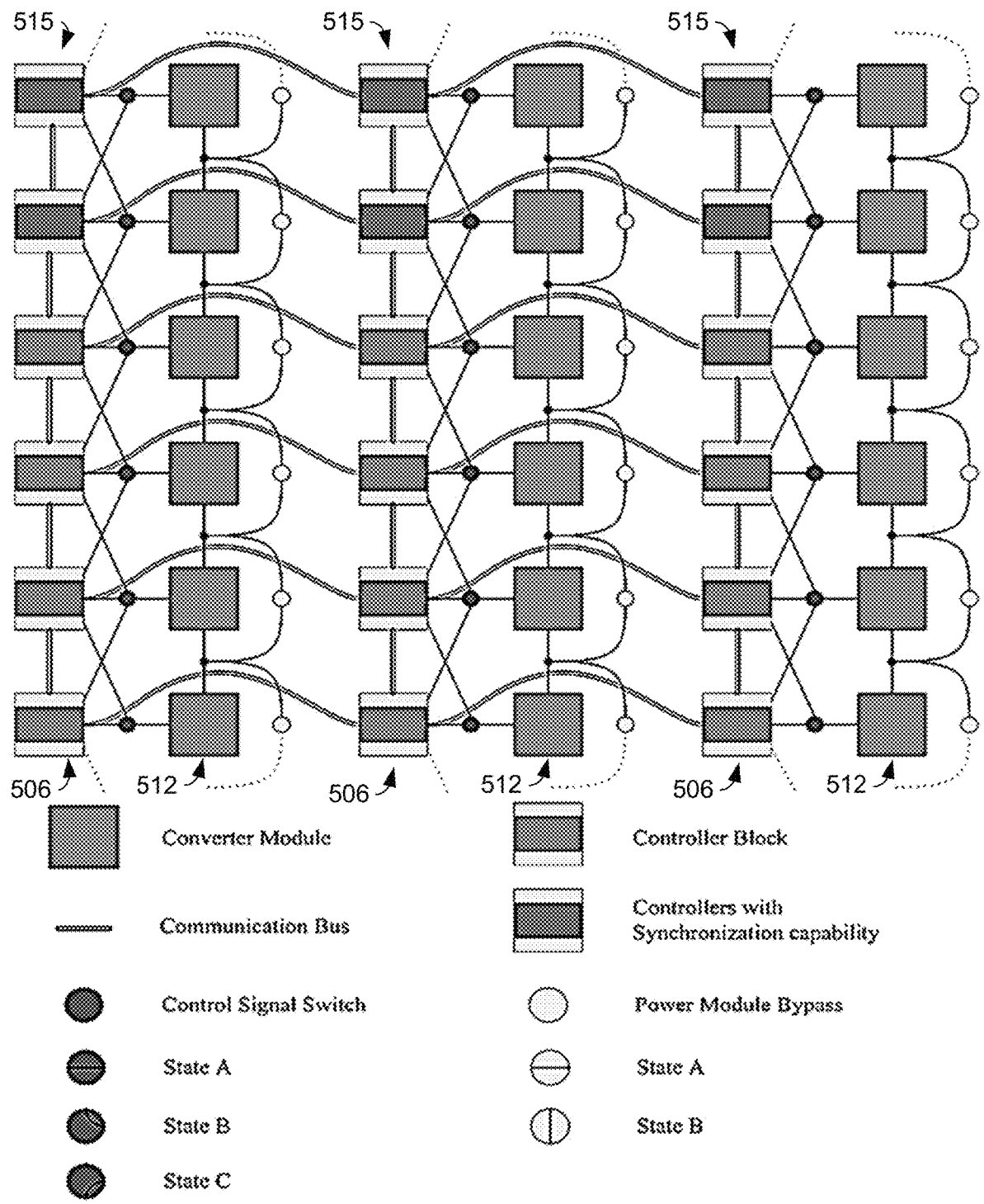
FIG. 25 is a schematic diagram illustrating an example of an architecture of a resilient two dimensional (2D) redundancy based fault-tolerant controller array for MMCs, in accordance with various embodiments of the present disclosure.

Architecture of Resilient Two Dimensional (2D) Fault-Tolerant Controller for MMC In the first generation of fault-tolerant controller for MMCs (FIG. 24), there was only one controller as the master (or supervisor) 503 and failure in this controller could be catastrophic. FIG. 25 is a schematic diagram illustrating an example of an architecture of a resilient two dimensional (2D) redundancy based fault-tolerant controller array for MMCs. In the proposed 2D controller, a set of controllers have access to global variables and are capable of performing the control tasks of the master controller (these controllers are called master-capable controllers 515). The master-capable controllers 515 can communicate to each other and through a process; the best of them would be selected as the master controller to synchronize the other controllers.

In the proposed 2D controller, connections are point to point, each controller has communication link to nearby controllers on four sides (e.g., north, south, west, east) and can send and receive data using serial port. Point-to-point connection enables the use of fiber optic transceiver in the physical layer of the communication link. Although it can be beneficial in galvanic isolation of the controller modules, there is no broadcasting capability available in this mode and previous methods for synchronizing controller may not be used. Therefore, the synchronization process in the proposed 2D controller is slightly different from the first generation controller. During the synchronization process, the proposed controller can be transformed into a first generation architecture, enabling broadcast capability from a master to all slave controllers. Therefore, it is possible to synchronize slave controllers to a master controller and share high-level control variables.

In this architecture, all of the controllers can perform the low-level control tasks of the slave controllers. In the slave controllers, each controller module controls the attached power module and gets feedback from adjacent modules too. By comparing the output result of the controllers and the measured variables by sensors, a failure in case of any contrast may be detected. Other methods like a time out of message arrival and internal circuitries for self-test may help to find failures in the controller modules. In case the main controller is not capable to control the power module, the adjacent controller module will detect the failure and if both modules agree on the existence of failure in the main module, one of the adjacent controllers will take the control. In case of a failure in the power module, that module can be bypassed and the effect of losing the power module can be compensated by increasing the value of the capacitor voltage in each module. Table 2 summarizes the specifications of the first generation controller and the proposed 2D controller for modular multi-level converters.

TABLE 2

Comparison between First Generation Fault-tolerant Controller and the Resilient Two-dimensional Redundancy based Fault-tolerant Controller Array

| Specification | First Generation Fault-tolerant Controller | Proposed 2D Fault-tolerant Controller |
|---|---|---|
| Architecture | Multiple one dimensional controller arrays | Two dimensional controller array |
| Master Controller | Single controller with redundancy inside it | Multiple controllers with access to global variables |
| Communication Network | Broadcast network from master to slaves | Point-to-point connection in four sides |
| Synchronization Mechanism | Massage broadcast by master controller | Dominant output synchronization |
| Slave Controllers Arrangement | Dynamic redundancy by adjacent controllers | Dynamic redundancy by adjacent controllers |

General Agreement Algorithm for Selecting the Master Controller

In the proposed 2D fault-tolerant controller, several controllers can synchronize other slave controllers. Only one of these controllers may handle the synchronization task and other controllers can function as slaves. The process of electing the best controller as the master controller can be based on the transaction between master capable controllers that will lead to general agreement on the master controller. The process can happen repeatedly to ensure that the master controller is functioning correctly and, in the case of a failure, another controller can replace it in the least amount of time. In the consensus process, several assumptions can be made before reaching the final agreement. First, all of the controllers can either respond to a message before a time-out or may never respond to it. Any modification of the messages by the controllers is not acceptable and will change the nature of the problem. The second assumption can be that the system is synchronous. In synchronous systems, there are finite bounds on processing and communication delays between non-faulty controllers. Controllers know these bounds and they can make decisions based on that. In asynchronous systems, these bounds are not known; therefore, it is not possible to design a deterministic consensus protocol in an asynchronous system. The goal is to form a voting algorithm that reaches the final agreement in a single step.

The decision of choosing the master out of the master capable controllers can be based on the functionality and health of the controllers. The chosen master controller can have the highest ranking among other controllers. The first step of the decision-making process can start with broadcasting a set of mutually measured variables by each controller to other master capable controllers, which have been acquired by measuring physical variables or as a result of dedicated algorithms. Therefore, each controller will have the data set from other controllers. After categorization of the received variables in the same data set and a multiset (V) of all variables can be formed as:

$$V = \{V_1, V_2, \ldots, V_i\}$$

$$V_j = \langle v_1, \ldots, v_k \rangle \forall j \in \{1, \ldots, i\}$$

$$v_k \leq v_{k+1} \forall k \in \{1, \ldots, k\} \quad (1)$$

There are two properties of the multiset (V) for reaching the final agreement. Its range $\rho(V)$ and its diameter $\delta(V)$, which are defined as follows:

$\rho(V_i) = [v_1 v_k]$: real interval spanned by $V_i$ $\delta(V_i) = (v_k - v_1)$: arithmetic difference between maximum and minimum The goal of proposed agreement algorithm is to achieve convergence in a single step. The voting algorithm F(V) is single-step convergence if two convergence conditions are met:

1—Validity: For each non-faulty process i, the voted value is within the range of correct values generated by functioning controllers, i.e., $F(V_i) \in \rho(U_{all})$; and 2—Convergence: For each pair of non-faulty process, i and j, the difference between their voted values is smaller than the diameter of the correct values received. i.e., $|F(V_i) - F(V_j)| \leq C\delta(U_{all})$ where $0 \leq C < 1$.

Parameter C is the convergence rate that tells the performance of the voting algorithm. A smaller value for C means a faster convergence rate for the voting algorithm.

Based on the V that has been gathered, it is possible to get the estimated correct variables ($U_i$) for each set. There can be different voting algorithms based on the statistical methods used to find the best value for each set. The method, which was used, is median-subsequent-reduce (MSR) and it calculates the median of a selected sub-sequence of the set. Therefore:

$$F(V_i) = \text{median}[Sel_\sigma(\text{Red}^T(V_i))]$$

$$\text{Red}^T(V_i) = \langle v_{(1+\tau)}, \ldots, v_{(V-\tau)} \rangle \quad (2)$$

In equation (2), $\text{Red}^T(V_i)$ omits the $\tau$ smallest and $\tau$ largest elements from the multiset. The selection function $Sel_\sigma$ applies a subsequent function to select a sub-multiset of $\sigma$ from the reduced multiset. The final voted value is the median of the selected multiset. The next stage is to rank all the master controllers based on the data they have provided and their specification. The ranking process can happen inside each controller and the chosen master controller can be announced to all master capable controllers. For the $i^{th}$ master controller, $W_{i,j}$ is the rank given to the $j^{th}$ master controller as provided below:

$$W_j = \sum_1^i C_i \cdot |F(V_i) - v_i| + D_j \quad (3)$$

$$M = \{j \mid W_j \text{ is minimum}\}$$

The ranking can be based on the difference between the value vice-controllers have provided and the voted value. The higher the difference, the less chance it would be chosen. Other factors like position of the controller in the array also make difference in the ranking ($D_i$). The chosen master controller by each vice-master controller ($M_i$) will be broadcast to the other controllers. Therefore, each controller knows which controller is the final master controller. The chosen master can perform the synchronization process and other controllers can bypass controllers that have chosen a master other than the selected master controller.

In distributed systems, slave controllers are synchronized with the master controller. The synchronization process helps the controllers to accomplish tasks in a timely manner and follow the schedule. Frequency (rate of oscillation), phase (start of the oscillation) and time (number of oscillations) are three important parameters that can be passed during synchronization from the master to the slaves. All of these variables are functions of the oscillator frequency and any frequency difference may cause an error in the system. These errors can be formulated as given below:

$$f_e = f_m - f_s \Rightarrow \omega_e = 2\pi f_e \qquad (4)$$

$$t_e = \frac{f_e}{f_m} \times t$$

$$\varphi_e = \omega_e \times t + \theta_{e_0}$$

In the above equations, the frequency of the master controller oscillator ($f_m$) is assumed as the reference frequency and its difference with the slave controller oscillator frequency ($f_s$) is the error ($f_e$). The time error ($t_e$) and phase error ($\varphi_e$) are functions of the oscillator frequency as well. One important synchronization parameter in network-controlled systems is the phase. Since the control tasks are executed sequentially, the phase difference may introduce error in the task management. It also can introduce interference in the communications if any time division multiple access (TDMA) method has been used. The error in timing parameters may also be introduced during the synchronization process. The synchronized time of the slave clock $k \in \{1, 2, 3, \ldots, K\}$ by the master is as below:

$$t_{s,k} = t_m + \theta(t_m) \qquad (5)$$

In this formula, $\theta(t_m)$ is the offset of the slave controller time compared to the master controller reference time, $t_m$. The offset is equal to:

$$\theta(t_m) = \gamma_{s,k} \cdot t_m + \omega_{s,k}(t_m) + \theta_{s,k}^0 \qquad (6)$$

where $\gamma_{s,k}$ is the deterministic skew, $\omega_{s,k}(t_m)$ is the variable deviation relative to the deterministic skew and $\theta_{s,k}^0$ is the initial offset between the master controller to the slave controller. In order to synchronize the slave clocks to a master clock, the master clock time ($t_m$) must be transmitted to the slave clocks passing through the communication link. This can introduce an error between the slave and master clocks as given by:

$$t_{s,k} \leftarrow t_m + \bar{d} + \theta \qquad (7)$$

Since the data is passed through packet-switched network, the round-trip time (RTT) can be calculated based on the delay between the master to slave ($D_{m \to s}$) and slave to master ($D_{s \to m}$) and can define the delay error as given below:

$$\bar{d} = \frac{RTT}{2} = \frac{D_{m \to s} + D_{s \to m}}{2} \qquad (8)$$

The delay error always exists in packet-switched networks and can decrease the accuracy of the synchronization by a great factor.

In the proposed 2D fault-tolerant controller, there is no single controller as the master (or synchronizer). Instead, there is a group of controllers, which can measure global variables and can synchronize other slave controllers through serial communication. In each module, the controller can communicate to other controllers via four serial ports (e.g., north, south, east, and west). Since the data signal can pass through several controllers to reach the last controller, the latency needs to be minimized or synchronization may not be valid anymore (e.g., the reference time between master controller and the slave controllers can be huge). The problem here is to find the shortest path between the master controller and all other slave controllers. This can guarantee the least amount of latency in the synchronization process.

Figure 26:
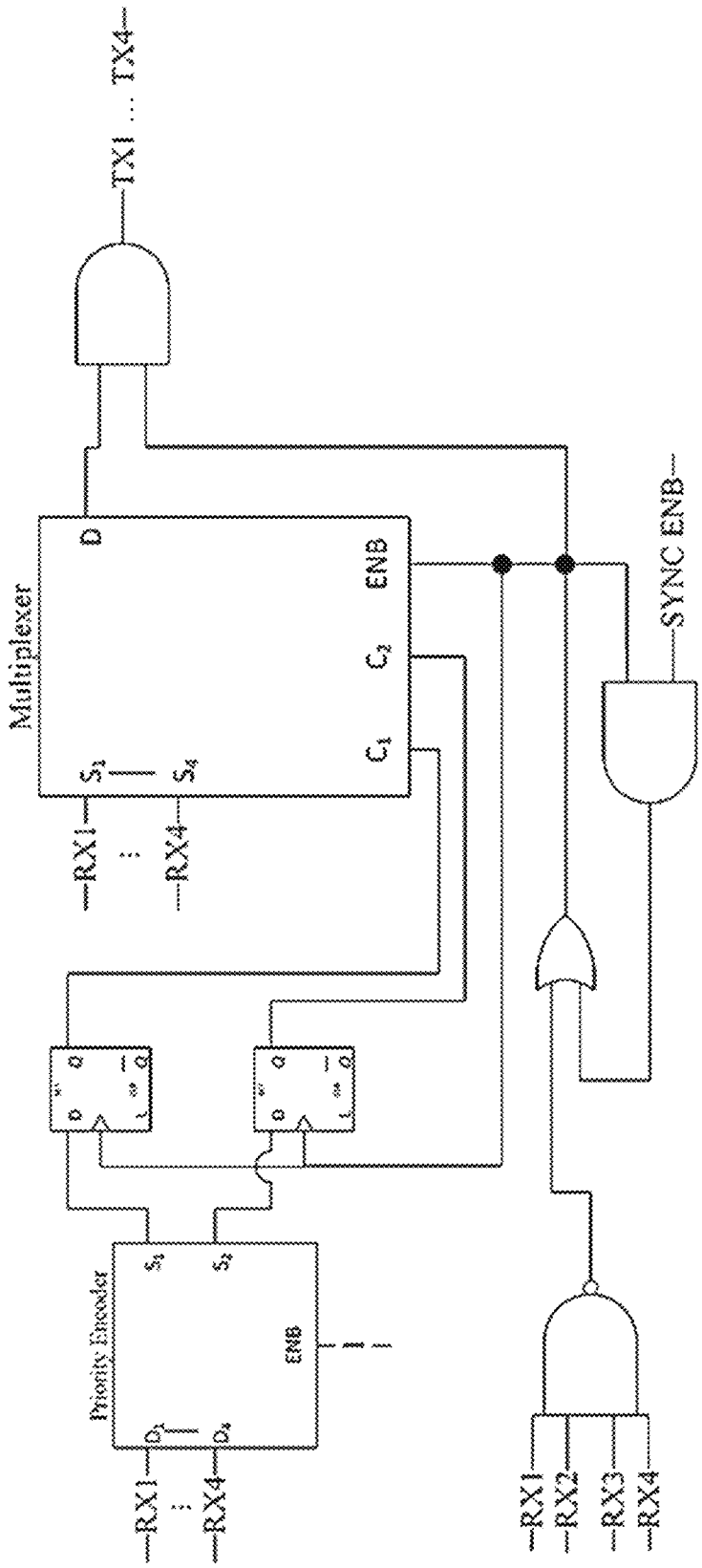
FIG. 26 is a schematic diagram illustrating an example of a hardware implementation of a DOMINO synchronization mechanism, in accordance with various embodiments of the present disclosure.

Dijkstra's algorithm is one of the algorithms that can be used in finding shortest path. This algorithm is beneficial if the graph of controllers is available and there is enough time to process the algorithm. It also gathers data from all controllers to the master controller for the algorithm and sends back the data to the slave controllers. This can use a huge amount of resources from the data link in the system, which may not be possible on the proposed controller. The proposed solution can use a hardware method based on Dijkstra's algorithm to find the shortest path, which can also implement a fault-tolerant synchronization for the controllers. This algorithm is based on a Dominant Output (DOMINO) mechanism. In this method, the master controller can start sending the bit-stream for the data packet. Whenever the first bit arrives, the internal circuit of the 2D controller can use that serial port for propagating data to other serial ports. In order to decrease the latency, the received signal at the serial port input of each module can be written to other serial outputs of the controller instantaneously, thereby propagating to the other controllers in the least amount of time. The arrival of the signal can be the reference time for the controllers. By activating the synchronization circuit, the controller waits for the first incoming bit on the receive input (RX) to set the direction flag. After locking onto the first incoming signal, this signal can be routed to all other serial outputs (TX). This propagates the data packet as well as the synchronization signal to all controllers. This synchronization algorithm can be done based on a time schedule, which is related to the controller's oscillator precision. FIG. 26 depicts an example of a hardware implementation of the DOMINO synchronization mechanism for the proposed 2D controller.

To show the effectiveness of the algorithm, a simulation based on Verilog was implemented. FIG. 27 illustrates the synchronization delay of the DOMINO algorithm in different failure cases. In this case, a 10×3 matrix with $D_h=7$ and $D_v=5$ was simulated under the different fault conditions. The proposed synchronization mechanism was effective, as long as there was a connection from the elected master controller to the slave controllers. Disabled controllers may only delay the synchronization process, but finally they would be synchronized.

Hardware Testbed of 2D Controller and Experimental Results

A hardware test-bed was designed (FIG. 16) to demonstrate and test the behavior of the proposed 2D controller in connection with converter hardware or the hardware in the loop (HIL) simulation. The test-bed comprises 13 Texas Instrument F28379D controller card (12 slave controllers and 1 master controller). The output signals from the controllers are fed into three separate FPGA cards (ACM-204-4008). These FPGAs help implement the fault-detection, fail-over, output comparison and other necessary circuits for the system. The analog signals from external resources were leveled to match the range of the micro controllers. FIG. 15 demonstrates the block diagram of the test-bed hardware. Fault handling circuits were implemented in the FPGAs. Incoming analog signals were leveled to match the controller specification and were shared between all controllers. It is possible to select the associated analog inputs based on the architecture.

Figure 28:
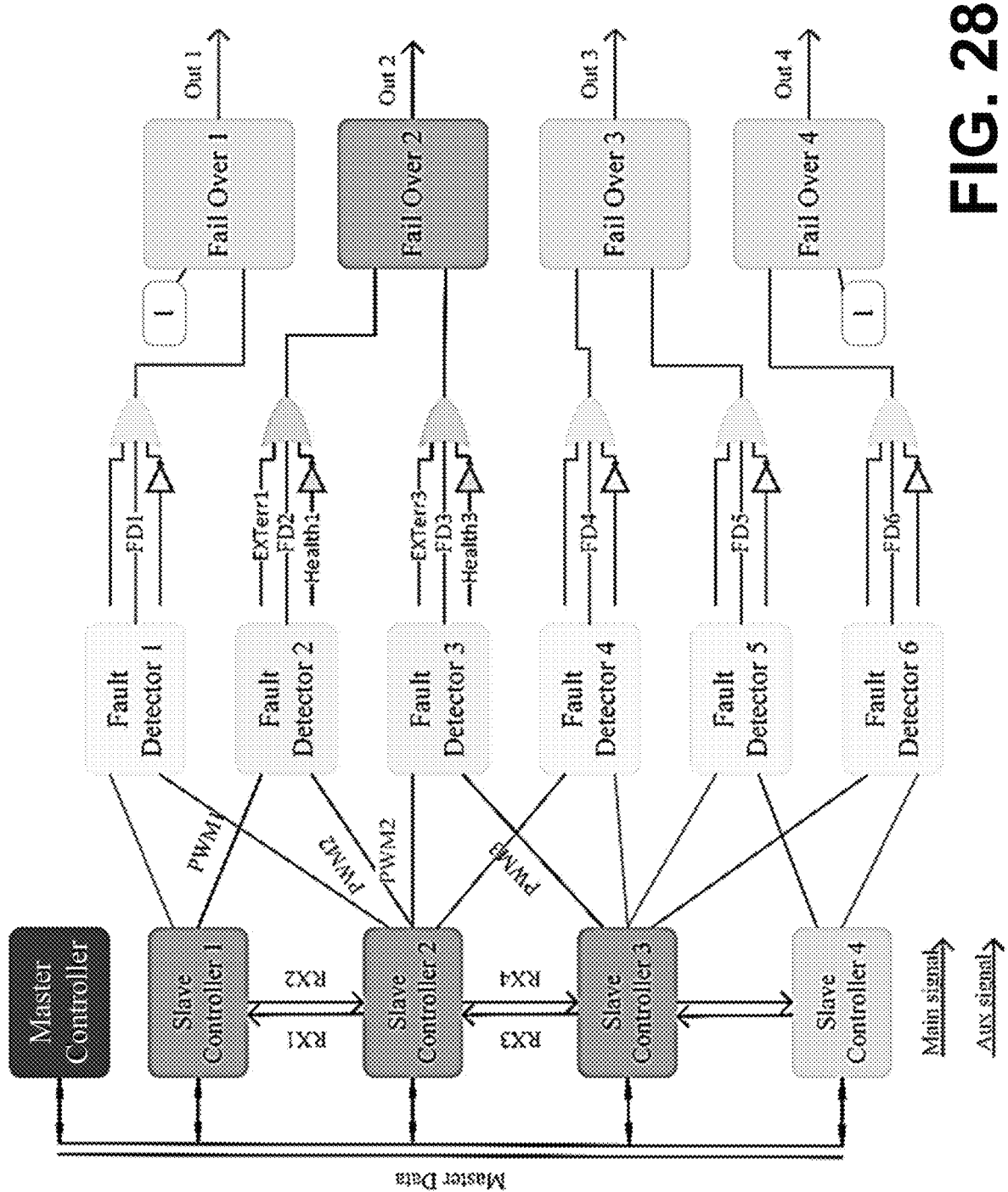
FIG. 28 is a schematic diagram illustrating an example of an architecture of the fault-tolerant controller (after programming and configuring the FPGA), in accordance with various embodiments of the present disclosure.

The final architecture of the fault-tolerant controller (after programming and configuring the FPGA) is demonstrated in FIG. 28, which illustrates an internal architecture of the fault-detection mechanism for module 2 in a converter array with 4 modules in each phase. In each phase, the four controllers are connected to the master controller through the shared communication bus. The master controller will run the supervisory control algorithm (high-level control) and update the slave controllers at each control step. Each slave controller does the control procedures for itself and the neighbor controllers. The output results of the slave controllers are compared in the fault detector block, which detects errors if outputs are not similar for the same module. A fault detection signal, external error from micro controller (communication error) and the health status of the controller can be given to the fail over circuit. The fail over circuit can then decide which controller should control each converter block based on the functionality status of the main controller and the adjacent controllers. As can be seen in FIG. 28, all of the blocks, which are related to fault handling for module 2, have been highlighted. All of the following experimental results are for module 2 and the nomenclature follows the signals in FIG. 28.

The proposed 2D controller was implemented for an MMC topology. In the following results, functionality of the controller under different failure modes was investigated. In each mode, a different failure was injected to the controller cards to emulate a single point of failure in the system. In all of the results, the focus was on controller number 2 and the experimental results are related to this controller (i.e., the effect of the failure in adjacent controllers on this controller).

Figure 29:
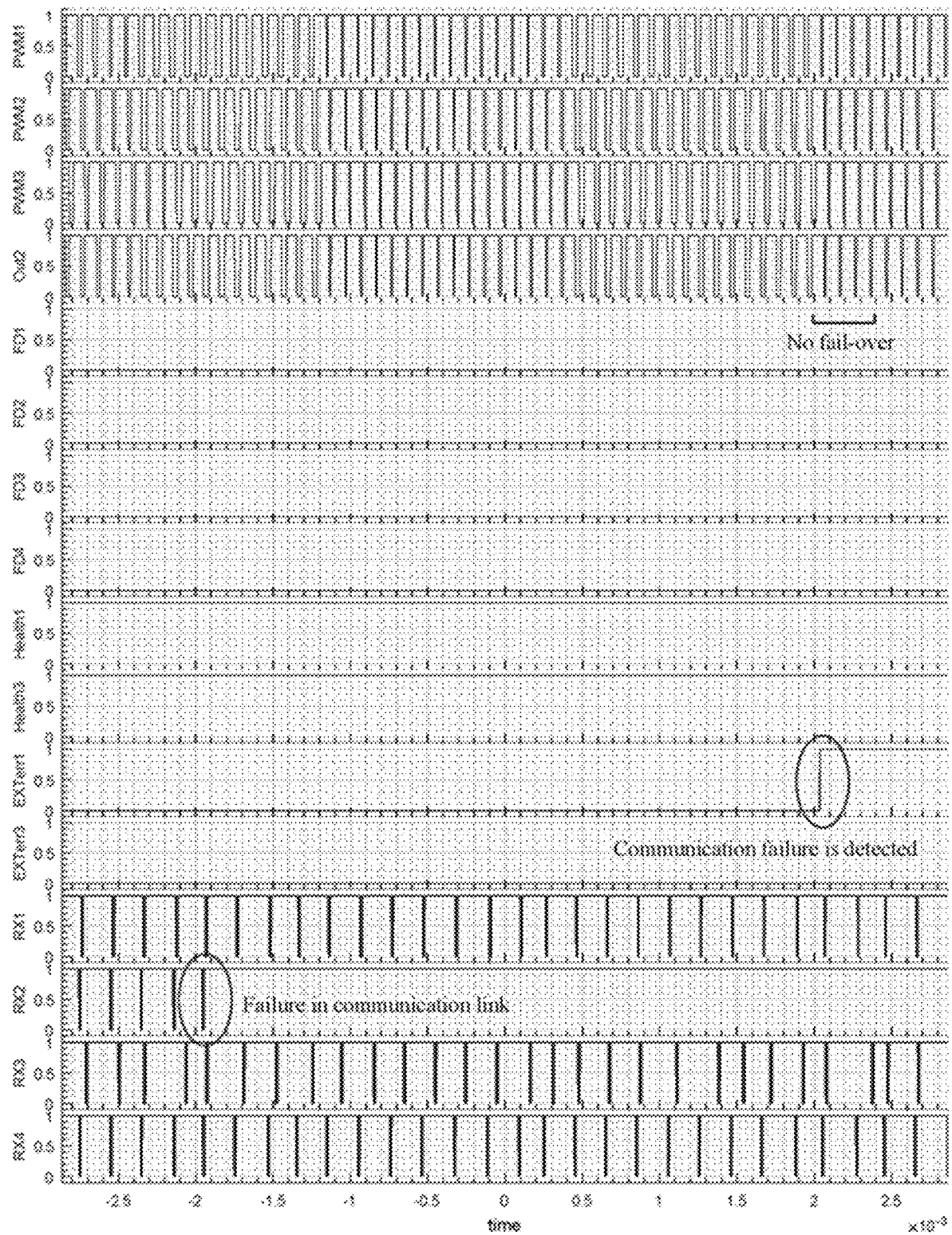
FIGS. 29-36 illustrate examples of measurements during failure testing, in accordance with various embodiments of the present disclosure.

FIG. 29 shows the case of a communication failure in module 1 in which the communication link from controller 1 to controller 2 has failed and its effect on module 2 in the MMC. Because of the communication failure, controller 2 may not receive any data, which would cause an error flag for controller 1 to turn on. Since it is not a common failure, controller 2 may not be affected at all.

Figure 30:
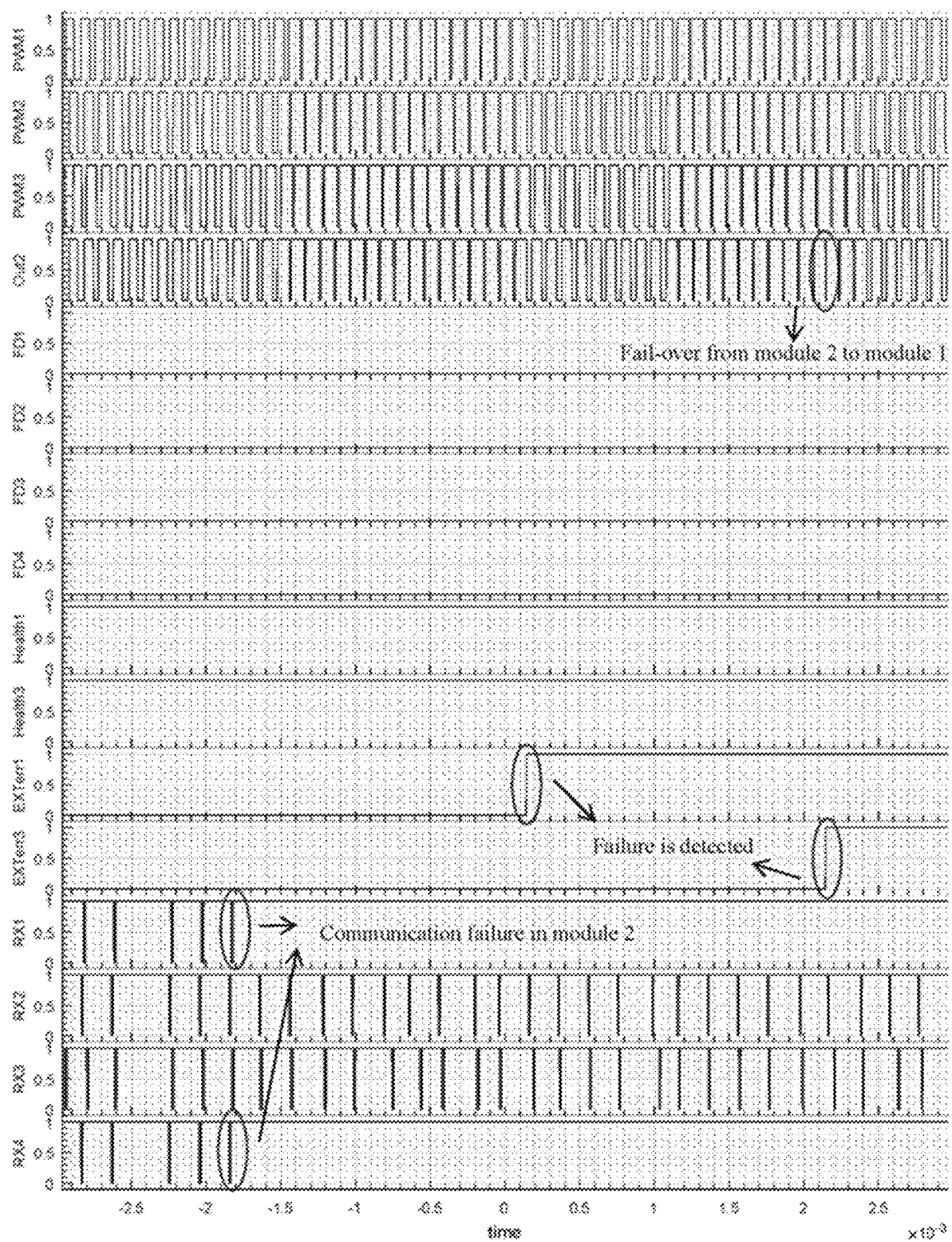

FIG. 30 shows the case of a communication failure in module 2 in which the communication link from controller 2 to other controllers has failed (this may happen because of a failure in controller 2) and its effect on module 2 in the MMC. Controllers 1 and 3 may not receive any data, which would cause an error flag from controller 1 and 3 to turn on. Since it is a common failure, controller 2 can be bypassed.

Figure 31:
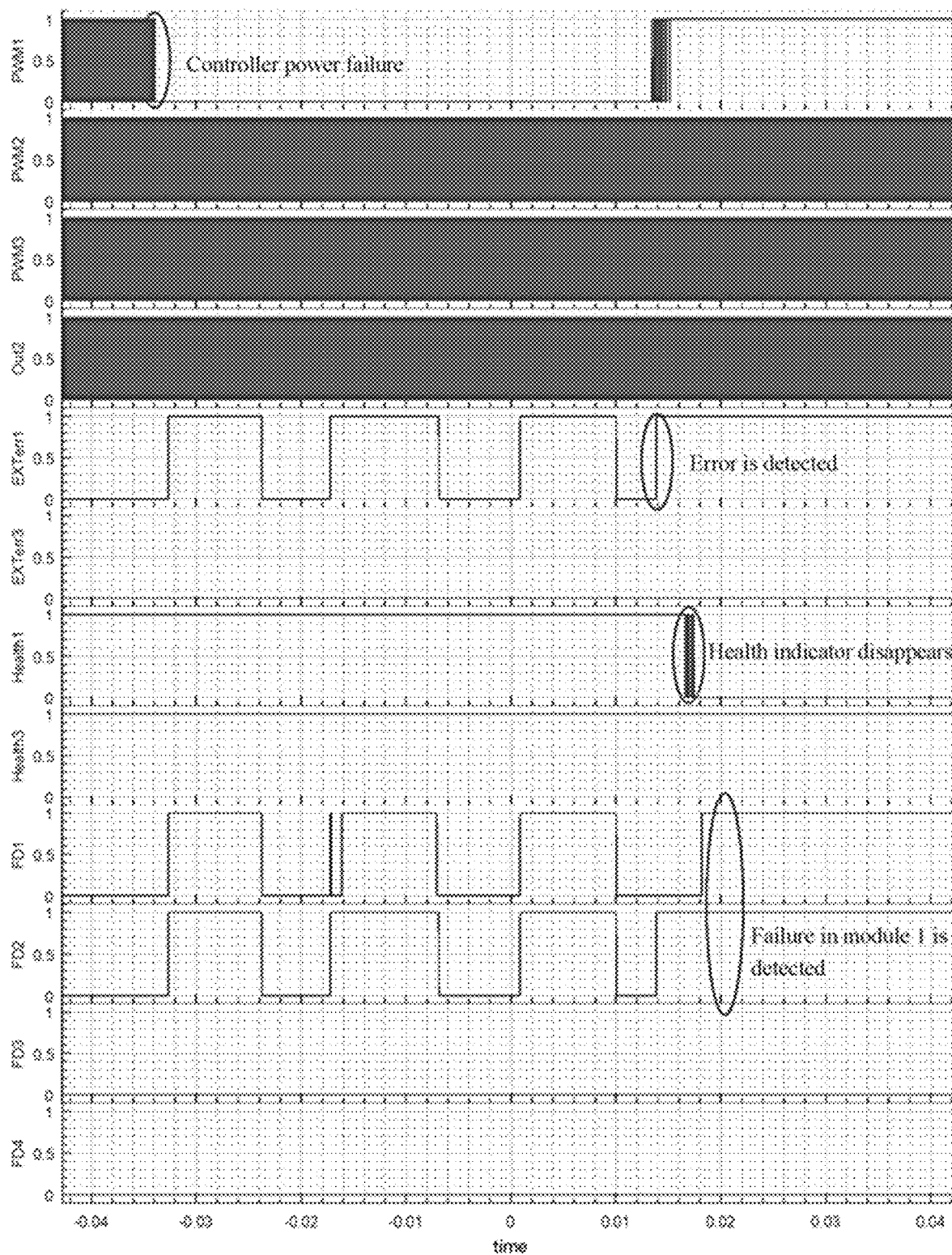

FIG. 31 demonstrates the case of a power failure in module 1 in which power supply of the controller 1 has failed (by turning off the controller card) and its effect on module 2 in the MMC. This failure can cause the fault detection related to controller 1 (FD1 and FD2) to turn on and turn on external error indicators from controller 1. Since it is not a common failure, controller 2 can continue its operation without interruption.

Figure 32:
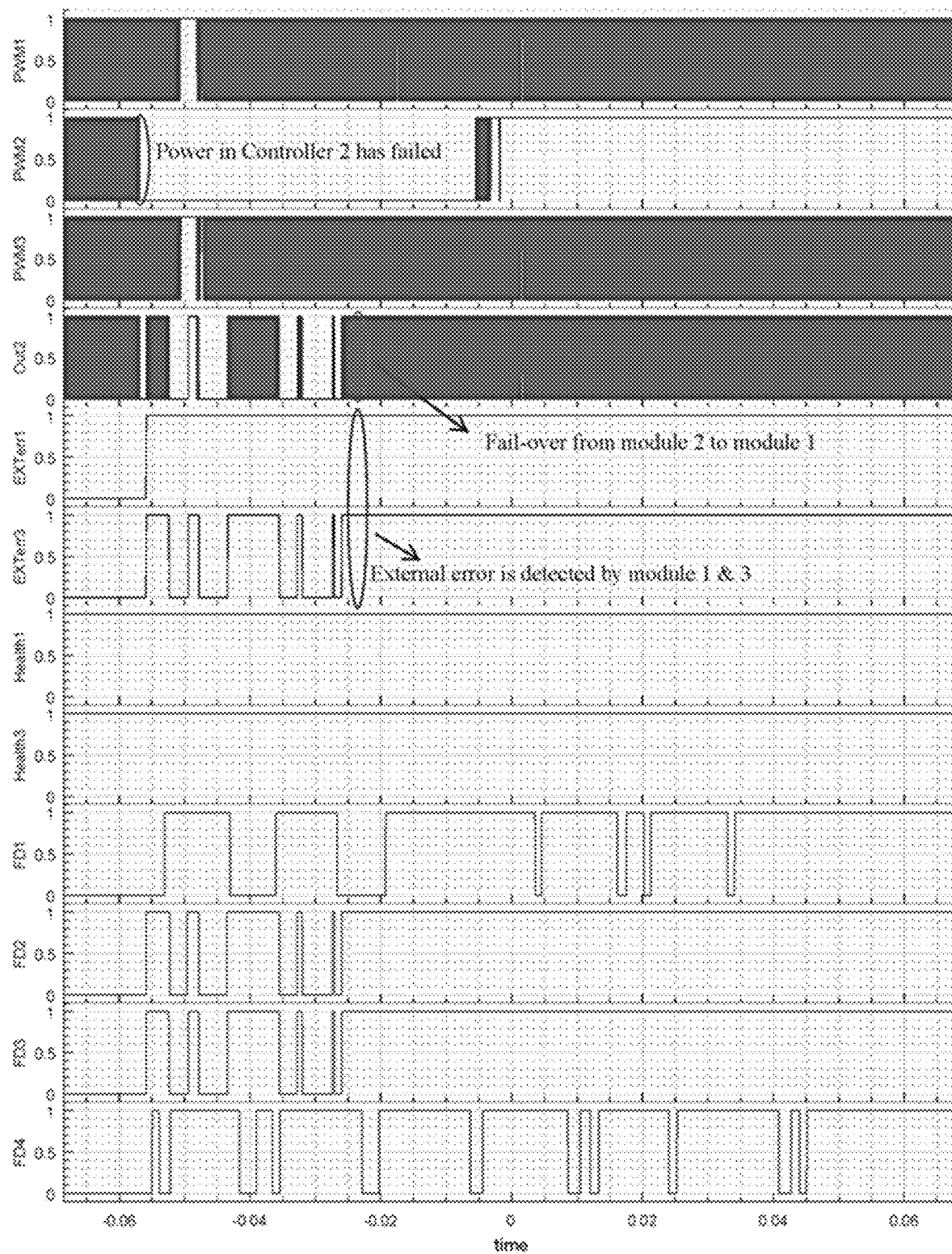

FIG. 32 shows the case of a power failure in module 2 in which power supply of the controller 2 has failed (by turning off the controller card) and its effect on module 2 in MMC. This failure can cause the fault detection related to controller 2 (FD1 to FD4) to turn on and turn on external error indicators from controller 1 and 3. Since it is a common failure, the first controller can bypass controller 2.

Figure 33:
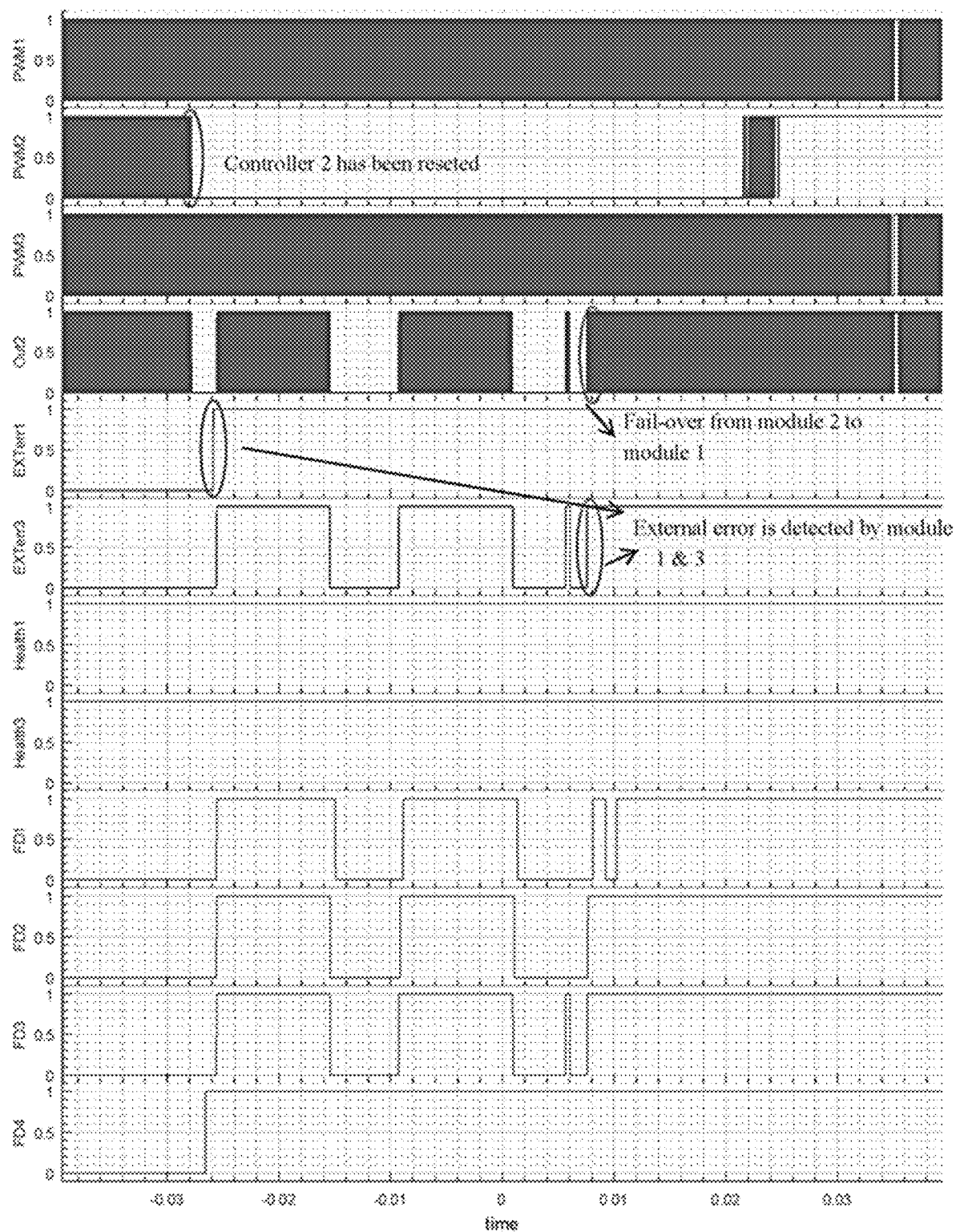

FIG. 33 shows the case of a micro-controller reset in module 2 in which controller card 2 has been restarted (by external reset pin) and its effect on module 2 in the MMC. The external restart can make it unavailable for a period of time and, during this time, it may not function correctly. This can turn on the external error for controllers 1 and 3 and can clear the health indicators for these controllers too. Since it is a common mode failure, controller 2 can be bypassed by the first controller.

Figure 34:

FIG. 34 demonstrates the case of a voltage sensor failure in module 1 in which the voltage measurement sensor in module 1 fails and its effect on module 2 in the MMC. This action was emulated by a step change (40% decrease in the value) in the measured capacitor voltage. The change in the measured value can trigger the external error signal in module 1 but since it is not a common error, it will not bypass the controller module 2.

Figure 35:
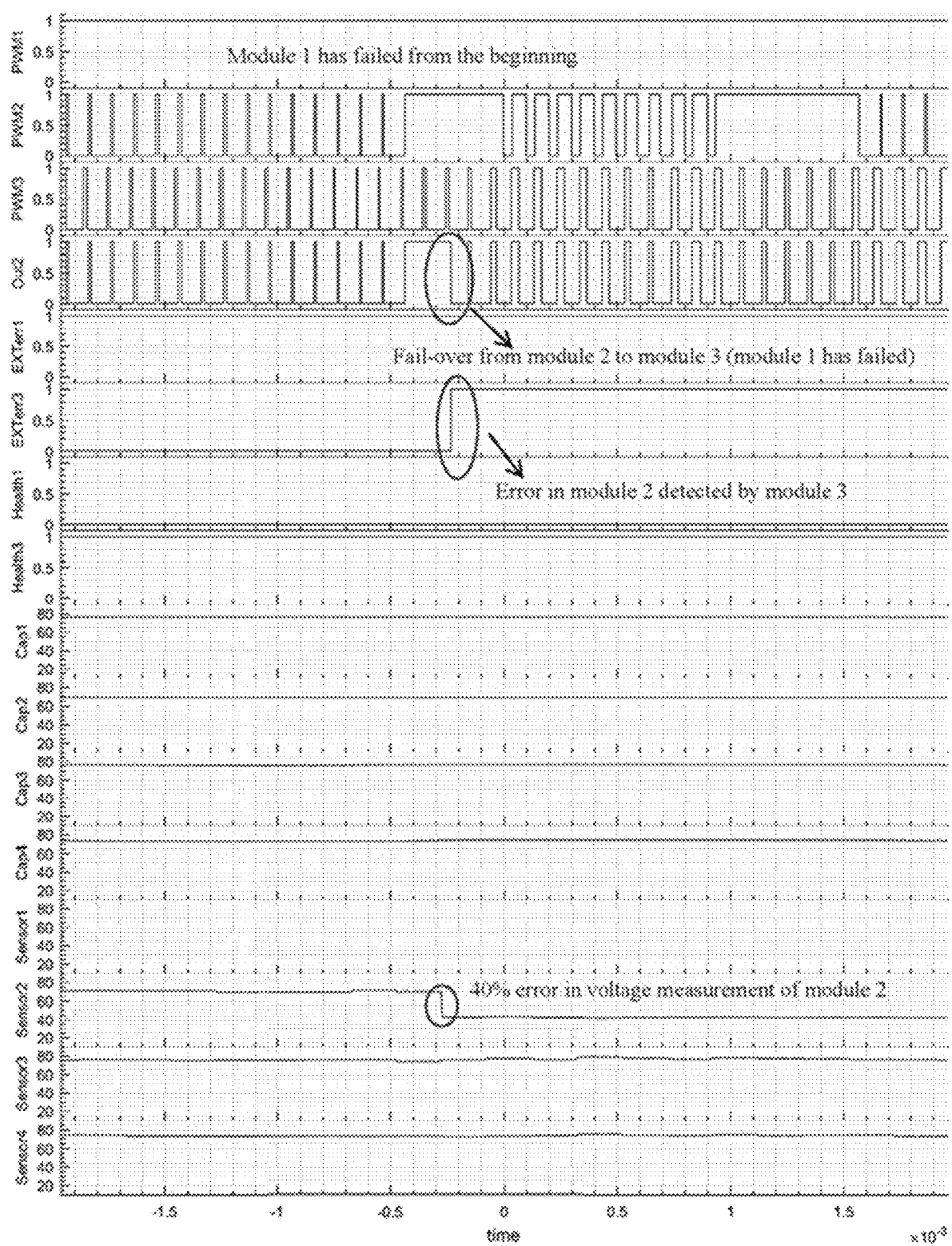

FIG. 35 demonstrates the case of a voltage sensor failure in module 3 in which the voltage measurement sensor in module 3 fails while module 1 has already been failed and its effect on module 2 in the MMC. This action was emulated by a step change (40% decrease in the value) in the measured capacitor voltage of module 3 while module 1 was turned off. The change in the measured value can trigger the external error signal in modules 1 and 3 but since it is a common error, it can bypass the controller module 2 to its adjacent controller (controller module 3).

Figure 36:
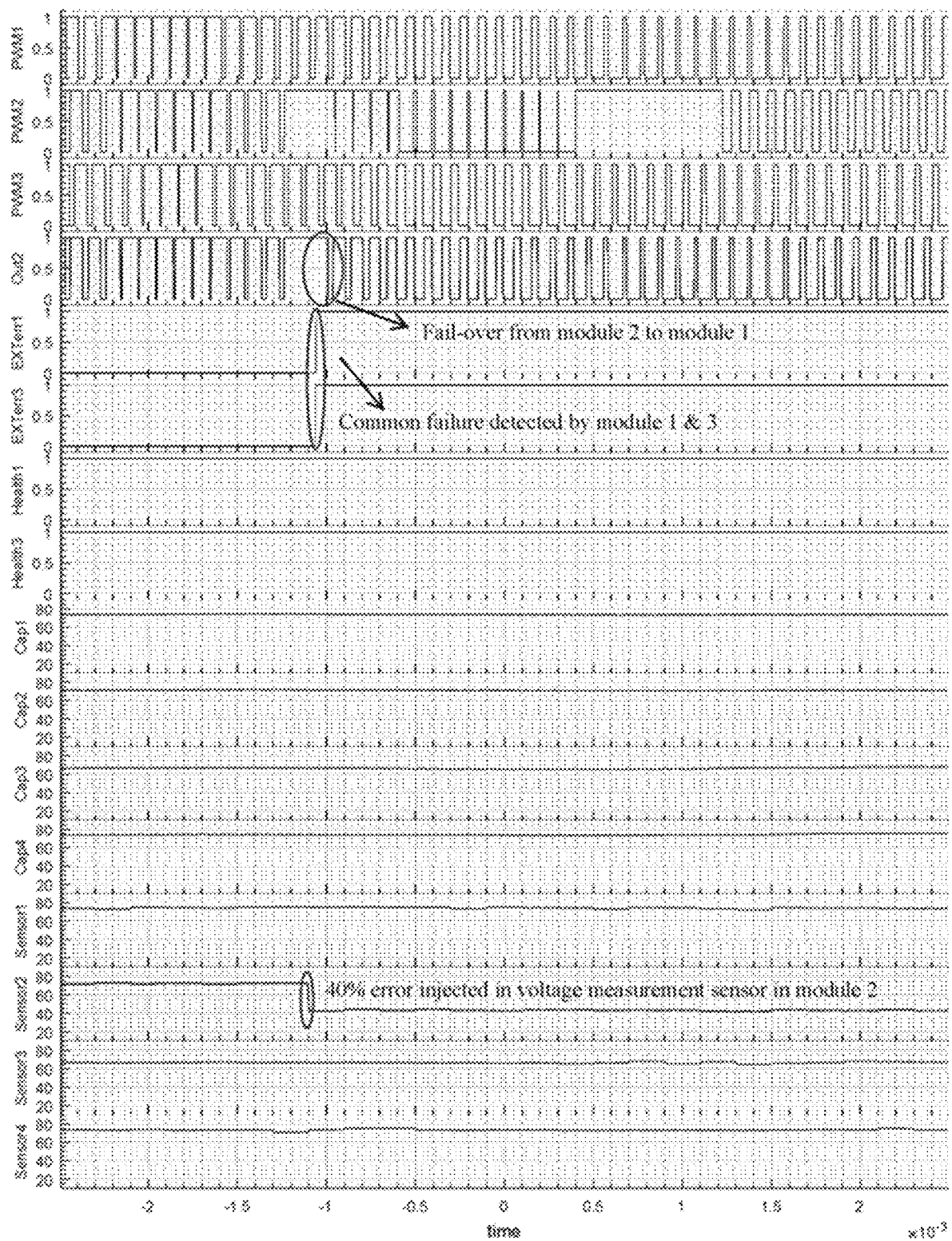

FIG. 36 demonstrates the case of a voltage sensor failure in module 2 in which voltage measurement sensor in module 2 fails and its effect on Module 2 in MMC. This action was emulated by a step change (40% decrease in the value) in the measured capacitor voltage of module 2. The change in the measured value can trigger the external error signal in modules 1 and 3 but since it is a common error, it can bypass the controller module 2 to its adjacent controller (controller module 1).

The MMC converter is modular and it can have higher availability compared to other converters. This benefit may not be readily available and it may be necessary to have a controller structure to take advantage of this benefit. The proposed 2D controller can increase the reliability of the final system thanks to its redundancy in controller blocks. Synchronization and master controller selection are beneficial parts of the network-controlled system, which can be used in the proposed 2D controller. Experimental results showed that the proposed 2D controller can be realized for real systems and failures in the controller can be bypassed.

OPAL-RT Test of Fault Tolerant Controller

Figure 37:
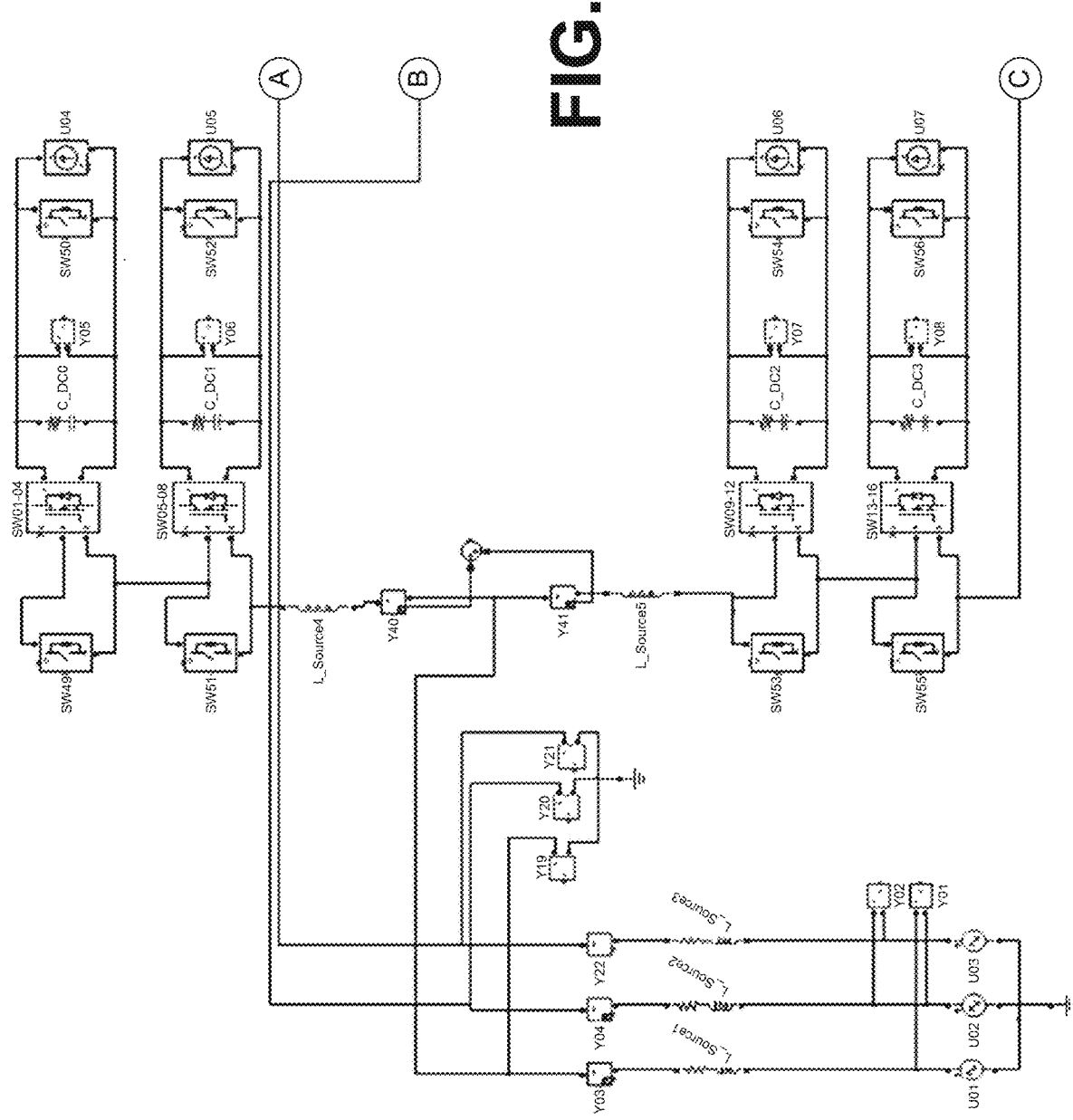
FIG. 37 is a schematic diagram illustrating an H-bridge OPAL-RT set-up for testing of the fault tolerant controller, in accordance with various embodiments of the present disclosure.

Further testing was carried out by implementing the fault tolerant controller with OPAL-RT. FIG. 37 is a schematic diagram illustrating the H-bridge OPAL-RT set-up including 12 capacitors. FIGS. 38-40 show examples of the 12 capacitor voltage readings [0]-[11] across each switch in the H-bridge. The voltage readings were taken at different time intervals ($t_1$, $t_2$, and $t_3$). as seen from FIGS. 38-40 respectively, with the capacitor voltages being stable across each capacitor. From these results it can be seen is that the controller is efficiently using different filters (low pass/all pass) and accurately controlling the capacitor voltages across the switches. If the capacitor voltages are not stable, then the controller would not be able to control the model.

A total of 13 DSPs was utilized with one master and 12 slaves. The master receives data from the model which was been set-up in OPAL-RT and uses different synchronization mechanisms and queues to send the data to the appropriate slave. Each slave is identified by its phase and module number. Each slave controls one switch using a PWM signal which in turn controls the capacitor voltage. The period of the PWM signal can be varied by the slave controllers which determines for how long the switch remains open or closed.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A multi-level converter, comprising:
an array of power modules, wherein each power module comprises a controller communicatively coupled to controllers of adjacent power modules in the array of power modules, the controller of each power module comprising circuitry, wherein the circuitry comprises fail-over circuitry that monitors a compare error and a communication error from the adjacent power modules, the circuitry configured to:
receive operational data from the adjacent power modules;
identify a fault condition in an adjacent power module based upon the operational data; and
initiate reconfiguration of the array of power modules in response to an indication of the fault condition, the reconfiguration bypassing the adjacent power module.

2. The multi-level converter of claim 1, wherein output needs of the array of power modules are switched to the adjacent power modules based upon health status signals received from the adjacent power modules.

3. The multi-level converter of claim 1, wherein the controller comprises fault detection circuitry that compares the operational data with pre-defined values to determine the presence of the fault condition.

4. The multi-level converter of claim 3, wherein the fault detection circuitry compares a difference between a control signal and an output of the adjacent power module.

5. The multi-level converter of claim 4, wherein the control signal is determined using an average voltage and a voltage phase.

6. The multi-level converter of claim 1, wherein the controller comprises built-in self test circuitry configured to provide a control signal indicating the presence of an internal fault in that power module.

7. The multi-level converter of claim 1, wherein the circuitry monitors communication signals from controllers of the adjacent power modules, where failure to detect a communication signal from the adjacent power module within a time out period indicates a fault condition in the adjacent power module.

8. The multi-level converter of claim 1, wherein the array of power modules comprise cascaded power converters.

9. A multi-level converter, comprising:
an array of power modules, wherein each power module comprises a controller communicatively coupled to controllers of adjacent power modules in the array of power modules, the controller of each power module comprising circuitry configured to:
receive operational data from the adjacent power modules;
identify a fault condition in an adjacent power module based upon the operational data; and
initiate reconfiguration of the array of power modules in response to an indication of the fault condition, the reconfiguration bypassing the adjacent power module; and
wherein the array of power modules comprises a two dimensional controller matrix comprising a set of master-capable controllers.

10. The multi-level converter of claim 9, wherein the set of master-capable controllers comprises a selected master controller and remaining master-capable controllers operate as vice-master controllers.

11. The multi-level converter of claim 10, wherein the selected master controller synchronizes operation of other power modules in the array of power modules.

12. The multi-level converter of claim 11, wherein the selected master controller utilizes a dominant output (DOMINO) synchronization mechanism for synchronization of the other power modules.

13. A method, comprising:
identifying, by a power module in an array of power modules of a multi-level converter, a fault condition in an adjacent power module based upon operational data from one or more adjacent power modules of the multi-level converter, wherein the identification is based upon a difference between a control signal and an output of the adjacent power module; and
initiating, by the power module, reconfiguration of the array of power modules in response to an indication of the fault condition, the reconfiguration bypassing the adjacent power module.

14. The method of claim 13, wherein the control signal is determined using an average voltage and a voltage phase.

15. The method of claim 13, further comprising monitoring a compare error and a communication error from the adjacent power modules.

16. The method of claim 13, wherein the control signal indicates the presence of an internal fault in that power module.

17. A method, comprising:
- identifying, by a power module in an array of power modules of a multi-level converter, at least one fault condition in an adjacent power module based upon operational data from one or more adjacent power modules of the multi-level converter, wherein failure to detect a communication signal from the adjacent power module within a time out period indicates a fault condition in the adjacent power module; and
- initiating, by the power module, reconfiguration of the array of power modules in response to an indication of the fault condition, the reconfiguration bypassing the adjacent power module.

18. The method of claim 17, wherein the reconfiguration comprises switching output needs of the array of power modules to the adjacent power modules based upon health status signals received from the one or more adjacent power modules.

19. The method of claim 17, wherein presence of the fault condition is determined based upon comparison of the operational data with pre-defined values.

20. The method of claim 17, wherein the array of power modules comprise a two dimensional controller matrix comprising a set of master-capable controllers.

* * * * *